US011967905B2

(12) United States Patent
Appelberg

(10) Patent No.: US 11,967,905 B2
(45) Date of Patent: Apr. 23, 2024

(54) NON-ISOLATED PULSE WIDTH MODULATED (PWM) FULL BRIDGE POWER CONVERTER WITH INTERCONNECTED WINDINGS

(71) Applicant: Flex Ltd., Singapore (SG)

(72) Inventor: Mikael H Appelberg, Farjestaden (SE)

(73) Assignee: Flex Ltd., Singapore (SG)

( * ) Notice: Subject to any disclaimer, the term of this patent is extended or adjusted under 35 U.S.C. 154(b) by 198 days.

(21) Appl. No.: 17/477,734

(22) Filed: Sep. 17, 2021

(65) Prior Publication Data

US 2022/0094276 A1    Mar. 24, 2022

Related U.S. Application Data

(60) Provisional application No. 63/081,207, filed on Sep. 21, 2020.

(51) Int. Cl.
*H02M 3/335* (2006.01)
(52) U.S. Cl.
CPC ............ *H02M 3/33592* (2013.01)
(58) Field of Classification Search
CPC ............................................. H02M 3/33592
See application file for complete search history.

(56) References Cited

U.S. PATENT DOCUMENTS

| 4,705,997 | A | 11/1987 | Juzswik |
| 6,013,935 | A | 1/2000 | Shie |
| 6,483,724 | B1 | 11/2002 | Blair et al. |
| 6,867,986 | B2 | 3/2005 | Amel |
| 6,952,355 | B2 | 10/2005 | Riggio et al. |
| 6,984,965 | B2 | 1/2006 | Vinciarelli |
| 7,027,313 | B2 | 4/2006 | Amei |
| 7,307,857 | B2 | 12/2007 | Liu et al. |
| 7,330,405 | B2 | 2/2008 | Matsui et al. |
| 7,616,465 | B1 | 11/2009 | Vinciarelli |
| 8,836,228 | B2 | 9/2014 | Xu et al. |

(Continued)

FOREIGN PATENT DOCUMENTS

JP    4552015    9/2010

OTHER PUBLICATIONS

"NBMTM Bus Converter, NBM2317S60E1560TOR," Vicor, Rev. 1.4, Nov. 2019, pp. 32.

(Continued)

*Primary Examiner* — Kyle J Moody
(74) *Attorney, Agent, or Firm* — Sheridan Ross P.C.

(57) ABSTRACT

An apparatus includes a first circuit path including a series combination of a primary winding of a transformer and a first secondary winding of the transformer and a second circuit path including a second secondary winding of the transformer. The primary winding of the transformer is magnetically coupled to the first and second secondary windings of the transformer and the primary winding of the transformer is detachably coupled to each of the first and second secondary windings of the transformer. The primary winding of the transformer is operative to generate a portion of an output current based on energy received from the primary winding of the transformer, and the second secondary winding of the transformer is operative to generate a remaining portion of the output current based on energy received from the second secondary winding of the transformer.

20 Claims, 19 Drawing Sheets

(56) References Cited

U.S. PATENT DOCUMENTS

| | | | |
|---|---|---|---|
| 8,937,817 | B2 | 1/2015 | Fornage et al. |
| 9,118,259 | B2 | 8/2015 | Ye |
| 9,548,668 | B2 | 1/2017 | Fu |
| 9,762,131 | B1 | 9/2017 | Wang et al. |
| 11,004,591 | B2 | 5/2021 | Appelberg et al. |
| 11,011,980 | B2 | 5/2021 | Rizzolatti et al. |
| 11,075,583 | B1 | 7/2021 | Vinciarelli et al. |
| 11,664,728 | B2 * | 5/2023 | Jin ................. H02M 3/155 323/282 |
| 2003/0142513 | A1 | 7/2003 | Vinciarelli |
| 2005/0254272 | A1 | 11/2005 | Vinciarelli |
| 2007/0040516 | A1 | 2/2007 | Chen |
| 2009/0129130 | A1 | 5/2009 | Young |
| 2009/0140706 | A1 * | 6/2009 | Taufik ............. H02M 3/1584 323/272 |
| 2009/0257248 | A1 | 10/2009 | Baptiste et al. |
| 2011/0068575 | A1 | 3/2011 | Zabtcioglu |
| 2011/0216559 | A1 | 9/2011 | Ng et al. |
| 2014/0268910 | A1 | 9/2014 | Li |
| 2018/0083541 | A1 | 3/2018 | Liang et al. |

OTHER PUBLICATIONS

"OCPUS18-Efficiency Improvement by Two-Stage 48V Solution," YouTube Video, Mar. 20-21, 2018, video slides, 15 pages, YouTube Video Link: https://www.youtube.com/watch?v=qNG9LNytwdA&t=511s&ab_channel=OpenComputeProject.

Jin et al., "Self-driven schemes for 12V self-driven voltage regulator," 2009 IEEE Energy Conversion Congress and Exposition, Sep. 20-24, 2009, pp. 1648-1654, doi: 10.1109/ECCE.2009.5316208.

Lang et al., "Solving the Power Density Challenge," Power Management, www.bodospower.com, Mar. 2020, pp. 32-33 pages.

Reusch et al., "Improved Transformer Design for High Frequency VRM Applications," 2008 Twenty-Third Annual IEEE Applied Power Electronics Conference and Exposition, Feb. 24-28, 2008, pp. 1483-1489, doi: 10.1109/APEC.2008.4522920.

Saggini et al., "A 99% Efficient Dual-Phase Resonant Switched-Capacitor-Buck Converter for 48 V Data Center Bus Conversions," 2019 IEEE Applied Power Electronics Conference and Exposition (APEC), Mar. 17-21, 2019, pp. 482-487, doi: 10.1109/APEC.2019.8721860.

Zhou, "High Frequency, High Current Density Voltage Regulators," Virginia Polytechnic Institute and State University, paper, Apr. 22, 2005, 198 pages.

Extended European Search Report for European Patent Application No. 21197348.2, dated Feb. 8, 2022 8 pages.

Sajadian et al., "Model Predictive Control of Dual-Mode Operations Z-Source Inverter: Islanded and Grid-Connected," IEEE Transactions on Power Electronics, Institute of Electrical and Electronics Engineers, May 1, 2018, vol. 33(5), pp. 4488-4497 [retrieved on Feb. 5, 2018].

Official Action for European Patent Application No. 21197348.2, dated Jun. 13, 2023 5 pages.

* cited by examiner

300

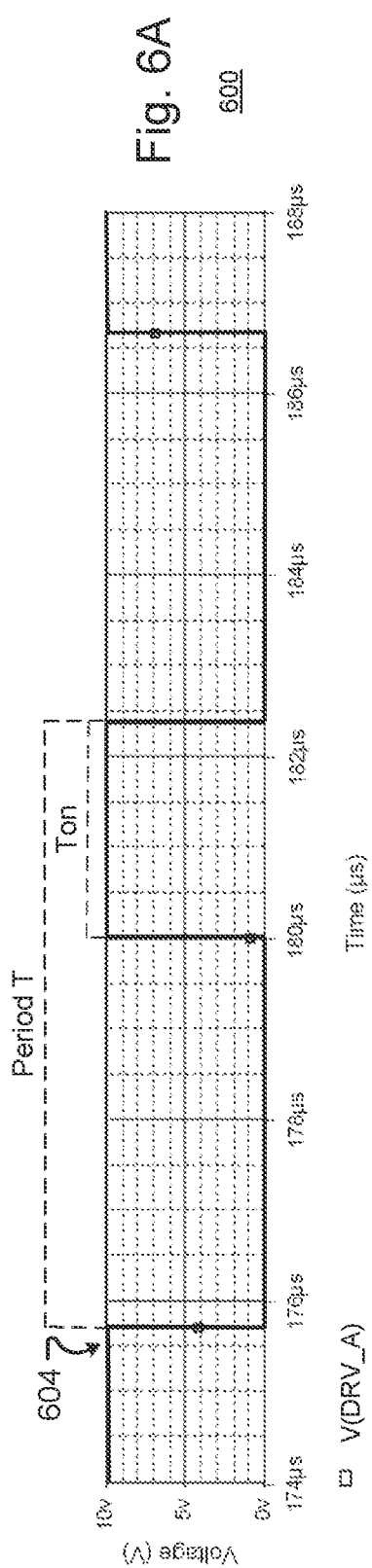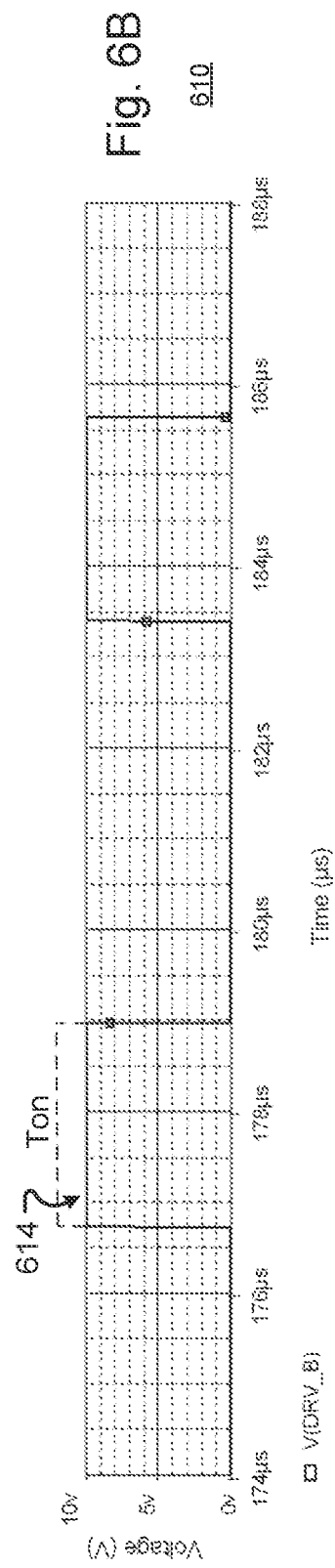

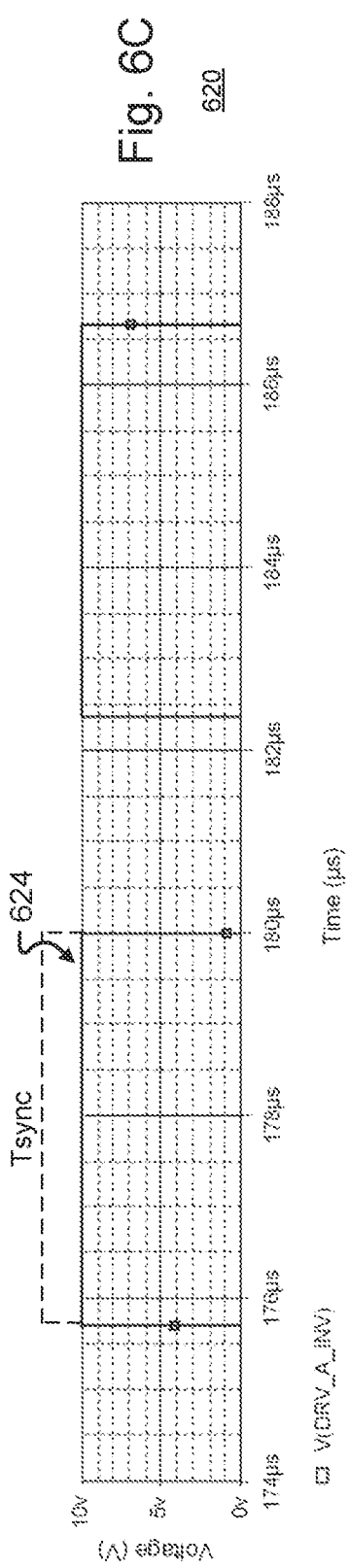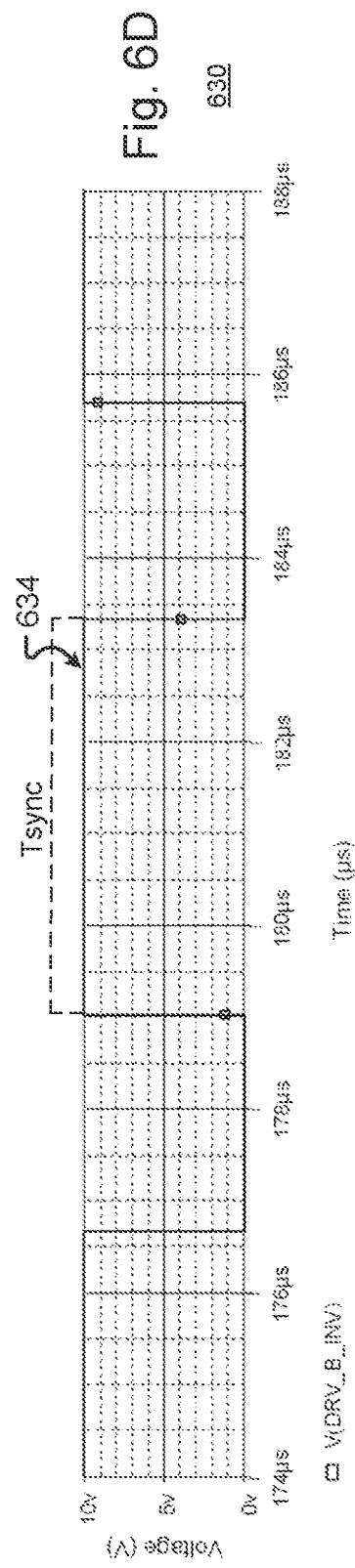

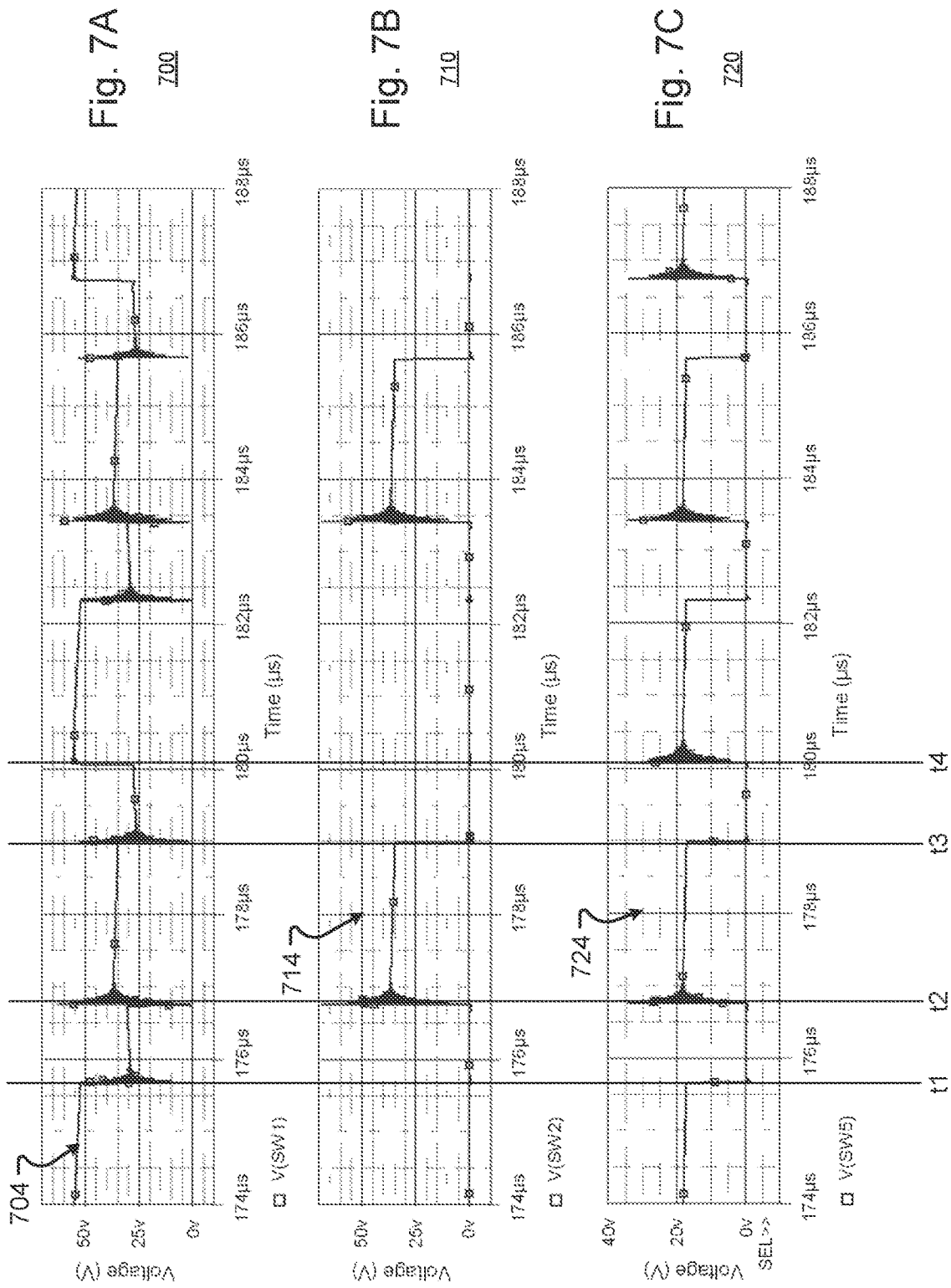

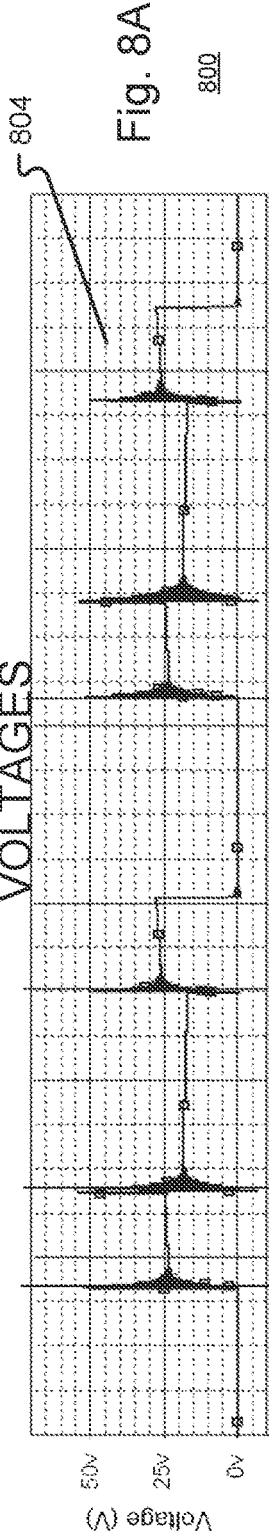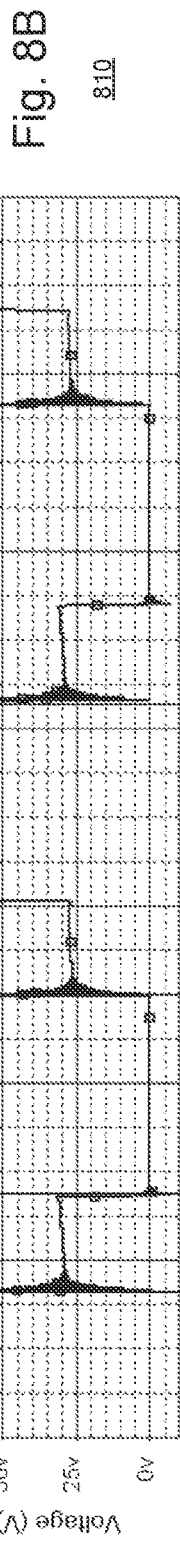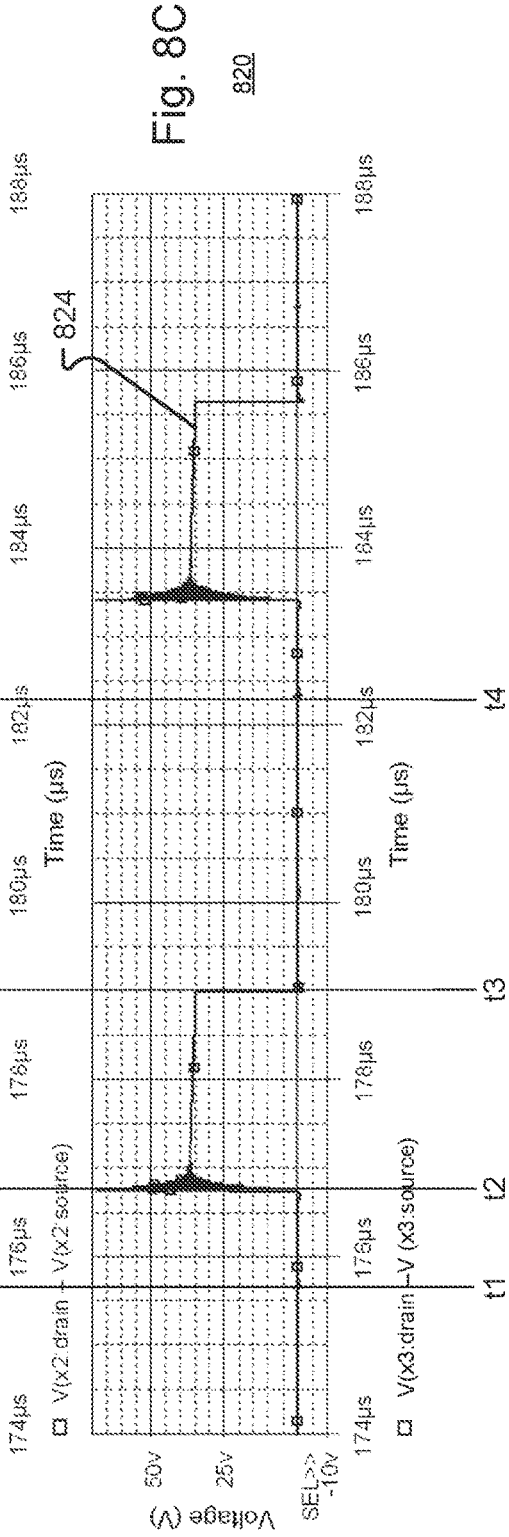

TRANSFORMER WINDING CURRENTS AND OUTPUT CURRENT

900

910

TRANSFORMER WINDING CURRENTS AND OUTPUT CURRENT

920

930

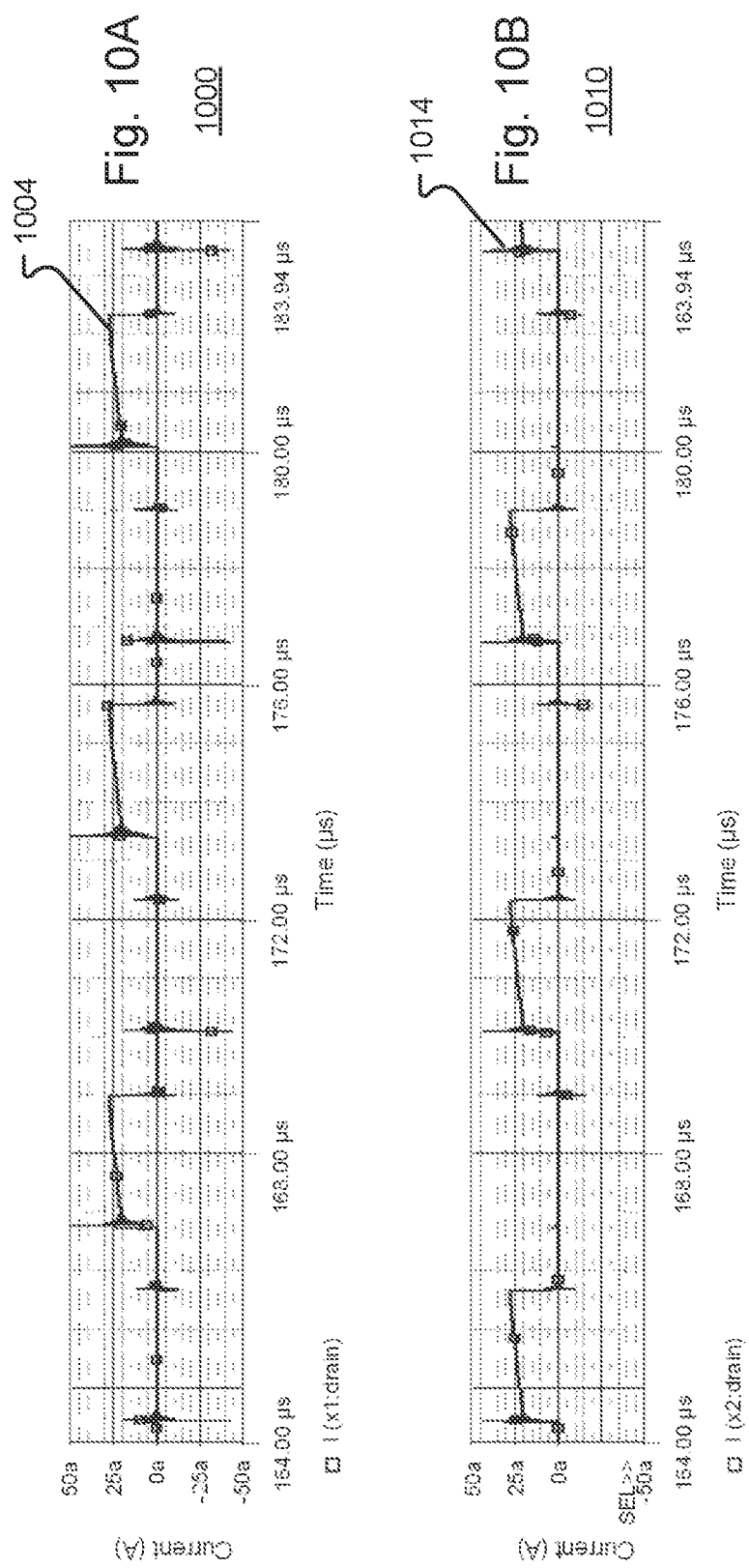

NON-ISOLATED PULSE WIDTH MODULATED (PWM) FULL BRIDGE POWER CONVERTER WITH INTERCONNECTED WINDINGS

CROSS REFERENCE TO RELATED APPLICATIONS

The present application claims the benefits of and priority, under 35 U.S.C. § 119(e), to U.S. Provisional Application Ser. No. 63/081,207, filed Sep. 21, 2020, entitled "NON-ISOLATED PWM FULL BRIDGE CONVERTER," which is hereby incorporated by reference, in its entirety, for all that it teaches and for all purposes.

FIELD

The present disclosure is generally directed to power converters and more particularly directed to a non-isolated pulse width modulated (PWM) full bridge direct current (DC)-to-DC power converter with interconnected transformer windings.

BACKGROUND

DC-to-DC power converters are used to convert a DC voltage at one level to a DC voltage at another level and deliver power to a load. Such convertors typically include a transformer, which provides power transfer from a primary input to a secondary output as a voltage converter. The transformer may also provide galvanic isolation between the primary input and the secondary output in most applications which is the physical and electrical separation between the primary input and the secondary output. As a result of the isolation, each of the isolated circuits (e.g., the primary input and the secondary output) has its own return or ground reference. In conventional topologies, the transformer is typically needed for high voltage conversion ranges from the primary input to the secondary output for good efficiency. Use of transformers, however, can cause large winding losses due to a large number of primary turns and high alternating current (AC) content in the secondary windings, which drives winding cost and the cost of the printed circuit boards housing the transformer.

Large datacenters contain rows and rows of server racks, which consume substantial amounts of power at a high cost. The increased power consumption in datacenters is driving a transition from a regulated power infrastructure which provides a voltage in the range of 12 volts of power to server boards to a power infrastructure where the server boards are powered by a voltage in the range of 40-60 volts. The 40-60 volts to 12 volts conversion takes place on the server board. This voltage range has been previously reserved for high-end servers.

The large volumes in the low/mid end server market are driving low cost and high efficiency requirements in server board power solutions converting the incoming 40-60 volts to a regulated 12 volts. To achieve this target, a number of concessions have been made. One concession is the removal of the isolation between the primary input voltage and the secondary output voltage of the DC-to-DC power converter.

Accordingly, what is needed is a system and method for reducing the losses of the transformer and rectification elements in a non-isolated environment.

BRIEF DESCRIPTION OF THE DRAWINGS

FIGS. 6A-6D are graphs illustrating the control signals for the power circuit switching elements for the non-isolated DC-to-DC power converter with interconnected transformer windings according to one embodiment of the present disclosure.

FIGS. 7A-7C are graphs illustrating switch node voltages for the power circuit switching elements for the non-isolated DC-to-DC power converter with interconnected transformer windings according to one embodiment of the present disclosure.

FIGS. 8A-8C are graphs illustrating power circuit switching element voltages for the non-isolated DC-to-DC power converter with interconnected transformer windings according to one embodiment of the present disclosure.

FIGS. 10A-10D are graphs illustrating the power circuit switching element currents and the output current for the non-isolated DC-to-DC power converter with interconnected transformer windings according to one embodiment of the present disclosure.

Figure 1:
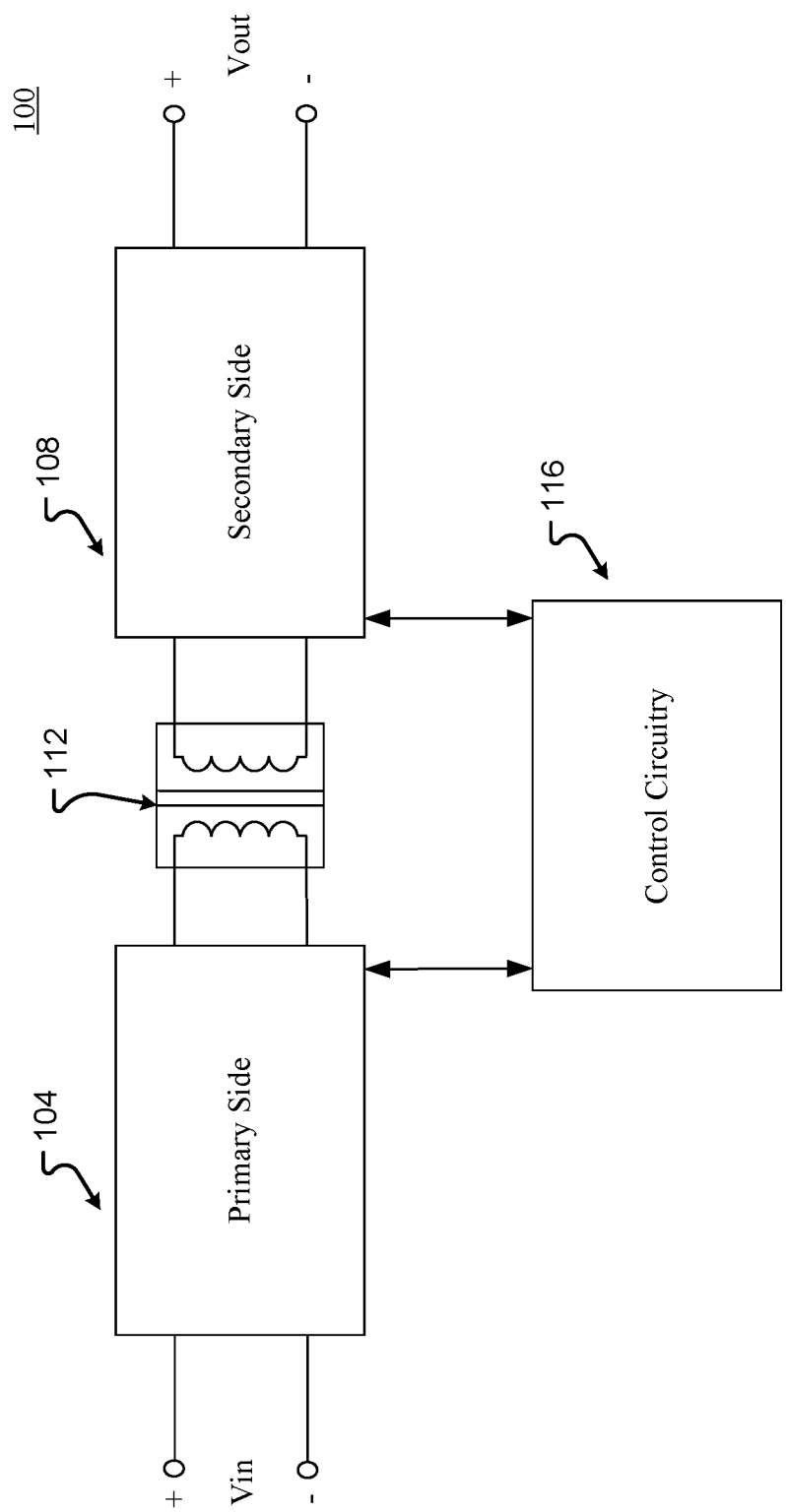
FIG. 1 is a block diagram representing a schematic configuration of a conventional isolated direct current (DC)-to-DC power converter.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

At least one example embodiment is directed to an apparatus. The apparatus includes a first circuit path including a series combination of a primary winding of a transformer and a first secondary winding of the transformer and a second circuit path including a second secondary winding of the transformer. The primary winding of the transformer is magnetically coupled to the first and second secondary windings of the transformer and the primary winding of the transformer is detachably coupled to each of the first and second secondary windings of the transformer. The primary winding of the transformer is operative to generate a portion of an output current based on energy received from the primary winding of the transformer, and the second secondary winding of the transformer is operative to generate a remaining portion of the output current based on energy received from the second secondary winding of the transformer.

At least one example embodiment is directed to a system. The system includes a power converter including a first circuit path including a series combination of a primary winding of a transformer and a first secondary winding of the transformer, a second circuit path including a second secondary winding of the transformer and first switching elements and first switching elements and second switching elements connected on opposing sides of the transformer and connected via a common ground. The primary winding of the transformer is magnetically coupled to the first and second secondary windings of the transformer and the primary winding of the transformer is detachably coupled to each of the first and second secondary windings of the transformer The primary winding of the transformer is operative to generate a portion of an output current based on energy received from the primary winding of the transformer and the second secondary winding of the transformer is operative to generate a remaining portion of the output current based on energy received from the second secondary winding of the transformer. The system further includes control circuitry configured to control switching of the first switching elements and the second switching elements to regulate an output voltage of the power converter.

At least one example embodiment is directed to a method. The method includes providing a first circuit path including a series combination of a primary winding of a transformer and a first secondary winding of the transformer and providing a second circuit path including a second secondary winding of the transformer. The primary winding of the transformer is magnetically coupled to the first and second secondary windings of the transformer and the primary winding of the transformer is detachably coupled to each of the first and second secondary windings of the transformer. The primary winding of the transformer is operative to generate a portion of an output current based on energy received from the primary winding of the transformer and the second secondary winding of the transformer is operative to generate a remaining portion of the output current based on energy received from the second secondary winding of the transformer.

The subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the subject matter may be practiced without these specific details. In other instances, well-known structures and devices are shown in block diagram form in order to facilitate describing the subject innovation.

Moreover, the word "exemplary" is used herein to mean serving as an example, instance, or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling.

The term "converter," as used herein, encompasses but is not limited to any one of, or any combination of "regulator," "DC regulator," "voltage regulator," "DC voltage regulator," DC-to-DC converter," "DC converter" and "converter," and includes, but is not limited to, the plain meaning of any of these terms.

One embodiment of the present disclosure described herein pertains to an electrically non-isolated direct current (DC)-to-DC power converter that might be used to deliver power at a low DC voltage from a source having a high DC voltage. In such a power converter, a transformer is used to provide a step-down (or step-up) in voltage level according to its turns-ratio. In other words, the full amount of the transformer current in the primary side is equal to the transformer current in the secondary side. If the system is pulse width modulated, the primary side and the secondary side will average the transformed voltage. In essence, the input power will equal the output power (minus conversion losses). For example, if the input voltage doubles, the input current will be reduced by half, while the output voltage and the output current remain constant. The power circuit switching elements are used in conjunction with capacitors and inductors to create the conversion. In an alternative embodiment of the present disclosure, power circuit switching elements are used in conjunction with capacitors and inductors for averaging the pulse width modulated voltage. Control circuitry is typically provided to drive signals to the power circuit switching elements.

Most DC-to-DC power converters are designed to provide regulation of their output voltage in the face of input voltage and output current variations. For example, a power converter might need to maintain a 12 volts output (plus or minus a few percent) as its input varies over the range of 36 to 75 volts and its output current ranges from 1 to 25 amps. This ability to provide regulation is usually the result of the power circuit's topology and the manner in which its power circuit switching elements are controlled. Sometimes the regulation function is supplied by (or augmented with) a linear regulator.

FIG. 1 is a block diagram representing a schematic configuration of a conventional isolated DC-to-DC power converter 100. An isolated power converter isolates the input from the output by electrically and physically separating the circuit for the power converter into two sections preventing direct current flow between the input and output, typically achieved by using a transformer. The power converter 100 generally includes a primary side 104 which includes one or more power circuit switching elements (not shown). The primary side 104 may receive an input voltage from a voltage source Vin. The power converter 100 also includes a secondary side 108 which may include a rectification circuit, a filter circuit and a load (not shown), for example. The secondary side 108 outputs an output voltage Vout. The secondary side 108 is isolated from the primary side by a transformer 112 having one or more primary windings and one or more secondary windings for example. The power converter 100 also includes control circuitry 116 for controlling the power converter 100 by determining when the one or more power circuit switching elements will be turned ON and OFF. The control circuitry 116 typically senses voltages and currents at the input, at the output, and/or within the power converter 100. With this topology of the conventional isolated DC-to-DC power converter 100, the current flowing in the primary side 104 is only circulating in the primary side 104 and the current flowing in the secondary side 108 is only circulating in the secondary side 108 due to the fact that each of the primary side 104 and the secondary side 108 has its own return or ground reference.

In conventional topologies, the transformer is typically needed for high voltage conversion ranges from the input to the output for good efficiency. Use of transformers, however, can cause large winding losses due to a large number of primary turns and high AC content in the secondary windings, which drives winding and printed circuit board costs.

Figure 2A:
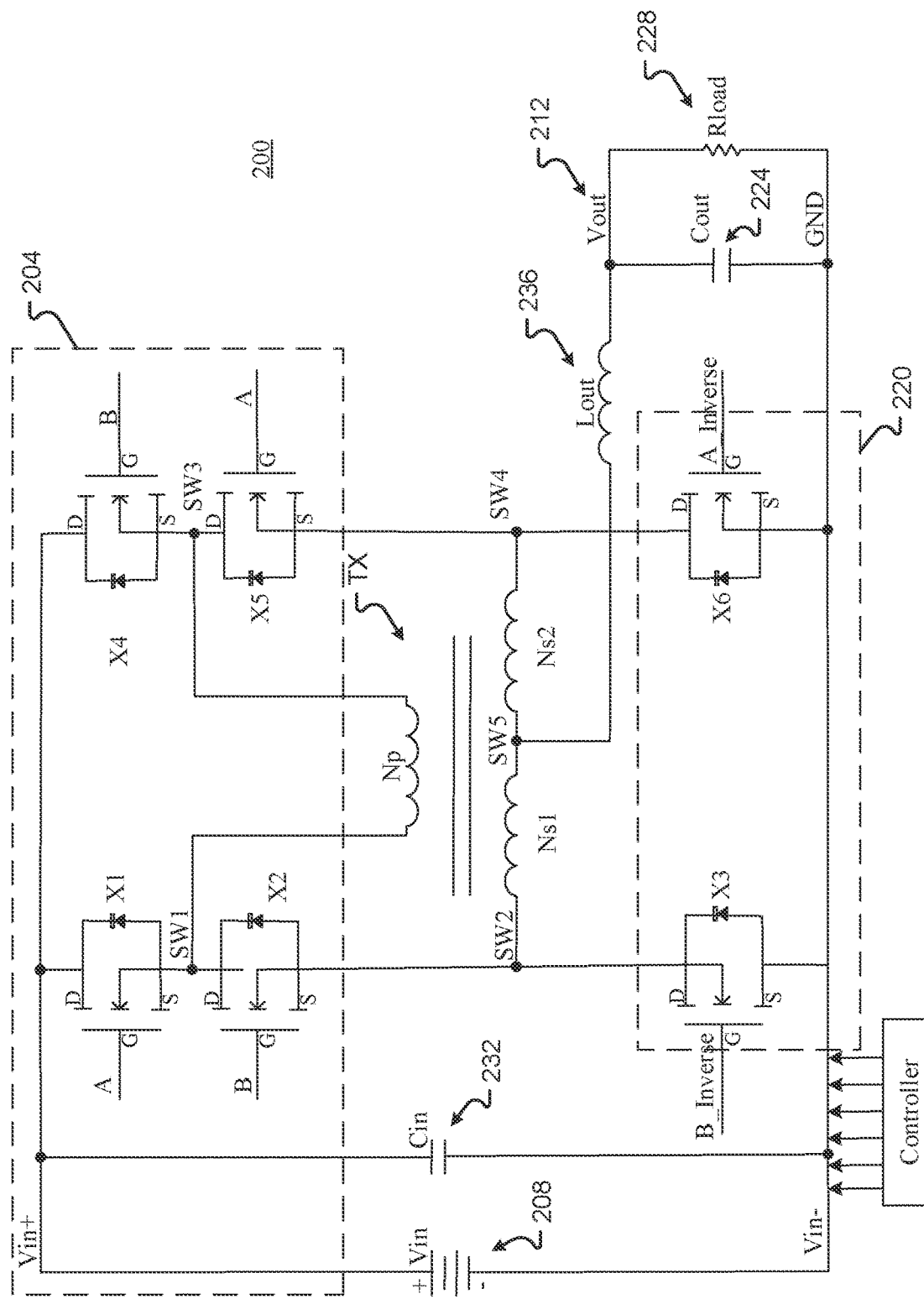
FIG. 2A is a circuit diagram representing a schematic configuration of a non-isolated DC-to-DC power converter with interconnected transformer windings according to one embodiment of the present disclosure.

FIG. 2A is a circuit diagram representing a schematic configuration of a non-isolated DC-to-DC power converter with interconnected transformer windings 200 according to one embodiment of the present disclosure. The power converter 200 includes a power circuit 204 including power circuit switching elements. The power circuit switching elements include two series connected power circuit switching elements in parallel with two series connected power circuit switching elements; X1, X2, X4, X5 arranged in a full bridge configuration. The power circuit switching elements X1, X2, X4, X5 may include, for example, metal-oxide-semiconductor field-effect transistor (MOSFET)s or gallium nitride (GaN) FETs. The power circuit 204 also includes an input voltage source 208 providing a DC input voltage Vin to the power circuit switching elements X1, X2, X4, X5. The power circuit 204 is configured to produce a unipolar square-wave voltage.

The power converter 200 also includes an output voltage 212 for providing a converted DC voltage as output voltage Vout, a transformer TX, a rectification circuit 220, a filter circuit 224 and a load 228.

An input capacitor Cin is coupled in parallel between the input voltage source 208 and the power circuit switching elements X1, X2, X4, X5. Input capacitor Cin acts as a filter for the input voltage Vin and buffers the energy. The transformer TX includes a primary winding Np coupled to the power circuit switching elements X1, X2, X4, X5 and secondary windings Ns1 and Ns2 coupled to the rectification circuit 220 and an output inductor 236 Lout. The number of windings associated with each of the primary winding Np and the secondary windings Ns1 and Ns2 can be any suitable value and vary depending on the embodiment. The filter circuit 224 includes a capacitor Cout and the load 228 is symbolized by a resister R mounted in parallel to the filter circuit 224. The capacitor Cout is provided to smooth the rectified voltage to the load 228. The filter circuit 224 is mounted in parallel with the rectification circuit 220.

As illustrated in FIG. 2A, the rectification circuit 220 includes two power circuit switching elements including a parallel diode X3, X6 arranged to provide synchronous rectification. Alternatively, the rectification circuit 220 can include more or less switching devices if desired and/or be configured without synchronous rectification.

Further in this example embodiment, the drain node (D) of the power circuit switching element X1 and the drain node (D) of the power circuit switching element X4 are connected to the input voltage source Vin. Further, the source node (S) of the power circuit switching element X1 is coupled to the drain node (D) of the power circuit switching element X2 (switch node SW1). The source node (S) of the power circuit switching element X4 is coupled to the drain node (D) of the power circuit switching element X5 (switch node SW2). The source node (S) of the power circuit switching element X2 is coupled to switch node SW2. The source node (S) of the power circuit switching element X5 is coupled to switch node SW4. The drain (D) of the power circuit switching element X3 is connected to switch node SW2; the source (S) of the power circuit switching element X3 is connected to ground. The drain (D) of the power circuit switching element X6 is connected to node SW4; the source (S) of the power circuit switching element X6 is connected to ground.

The power converter 200 of FIG. 2A includes one or more controller(s) 250 for generating control signals (e.g., pulse-width modulated (PWM) signals) for the power circuit switching elements X1, X2, X3, X4, X5, X6. As illustrated in FIG. 2A, the control signal A controls the power circuit switching elements X1 and X5; the control signal B controls the power circuit switching elements X2 and X4; the control signal A_Inverse controls the power circuit switching element X6; and the control signal B_Inverse controls the power circuit switching element X3. According to an alternative embodiment of the present disclosure, control signal A can be split into two control signals (A_X1 and A_X5) and control signal B can be split into two control signals (B_X2 and B_X4) for control reasons (e.g., compensate for delays in driving circuitry, different modulations during start-up, etc.) The controller 250 of FIG. 2A can include one or more gate drive circuits and/or other suitable drive circuits to generate control signals.

The controller 250 is adapted to vary the duty cycle of the control signals (e.g., A, B, A_Inverse, B_Inverse) to regulate the output voltage Vout. In general, the frequency is normally kept constant, but the frequency can be modulated to reduce current ripple. As illustrated in FIG. 2A, the power circuit switching elements X1, X2, X4, X5 are shunt or clamped by their intrinsic capacitance and by their intrinsic body diodes. As also illustrated in FIG. 2A, the power circuit switching elements X3, X6 are shunt or clamped by their intrinsic output capacitance and by their intrinsic body diodes.

In the non-isolated embodiment, a common ground (e.g., GND) is provided for the entire circuit of the power converter 200. As such, the secondary windings Ns1, Ns2 are made part of (e.g., interconnected with) the primary winding Np. With this arrangement, several benefits can be achieved. According to embodiments of the present disclosure, regulation of the voltage and the elimination of a capacitive divider section are achieved. According to embodiments of the present disclosure in the charging phase, the primary winding Np is connected in series with both ends of the secondary winding Ns1, Ns2 depending on which phase of the power converter 200 conducts.

According to the operation of the power converter 200 of the present disclosure, when no energy is transported from the input Vin to the output Vout, referred to as the discharge phase, indicating that all the energy delivered to the output is taken from the output inductor Lout, both power circuit switching elements X3, X6 conduct (e.g., these power circuit switching elements are closed) and the other power circuit switching elements X1, X2, X4, X5 do not conduct (e.g., these power circuit switching elements are open). This will result in the voltage across the transformer TX being clamped to zero and half of the output current flowing in each of the secondary windings Ns1, Ns2. The charging and discharging will create a PWM pulse train with the amplitude Vin*Ns/(Np+2*Ns), where Ns=Ns1=Ns2 in the switch node SW5 which is provided between the secondary windings Ns1 and Ns2. This pulse train is then averaged by the output inductor 236 Lout and the output capacitor 224 Cout. The output is modulated according to: Vout=Vin*D*Ns/(Np+2*Ns) where D is the duty cycle achieved by the PWM and defined as the sum of the ON time, Ton, of the control signals A and B divided by the period.

According to one embodiment of the present disclosure, when in the charging phase, when energy is transferred from the input Vin to the output Vout and the output inductor Lout, the primary current Ip is transferred to the output, instead of just circulating in the primary side of the power converter, which is the case in a conventional isolated power converter. Is=Iout*(1−Ns/(Np+2*Ns)) and Ip=Iout*Ns/(Np+2*Ns).

If there are concerns about voltage/time mismatch between the A and B branches, a DC block capacitor can be added in series with the primary winding Np. FIG. 2C is an alternative circuit diagram representing a schematic configuration of the non-isolated DC-to-DC power converter with interconnected transformer windings 210 according to one embodiment of the present disclosure. According to one embodiment of the present disclosure, a capacitor Cblock 1, Cblock 2 is provided that will block a DC current which can occur if the A control signal and the B control signal are not equally matched. Accordingly, either capacitor Cblock 1 is provided at location A or capacitor Cblock 2 is provided at location B that will block the DC current if control signal A is not equally matched with control signal B.

Figure 2B:
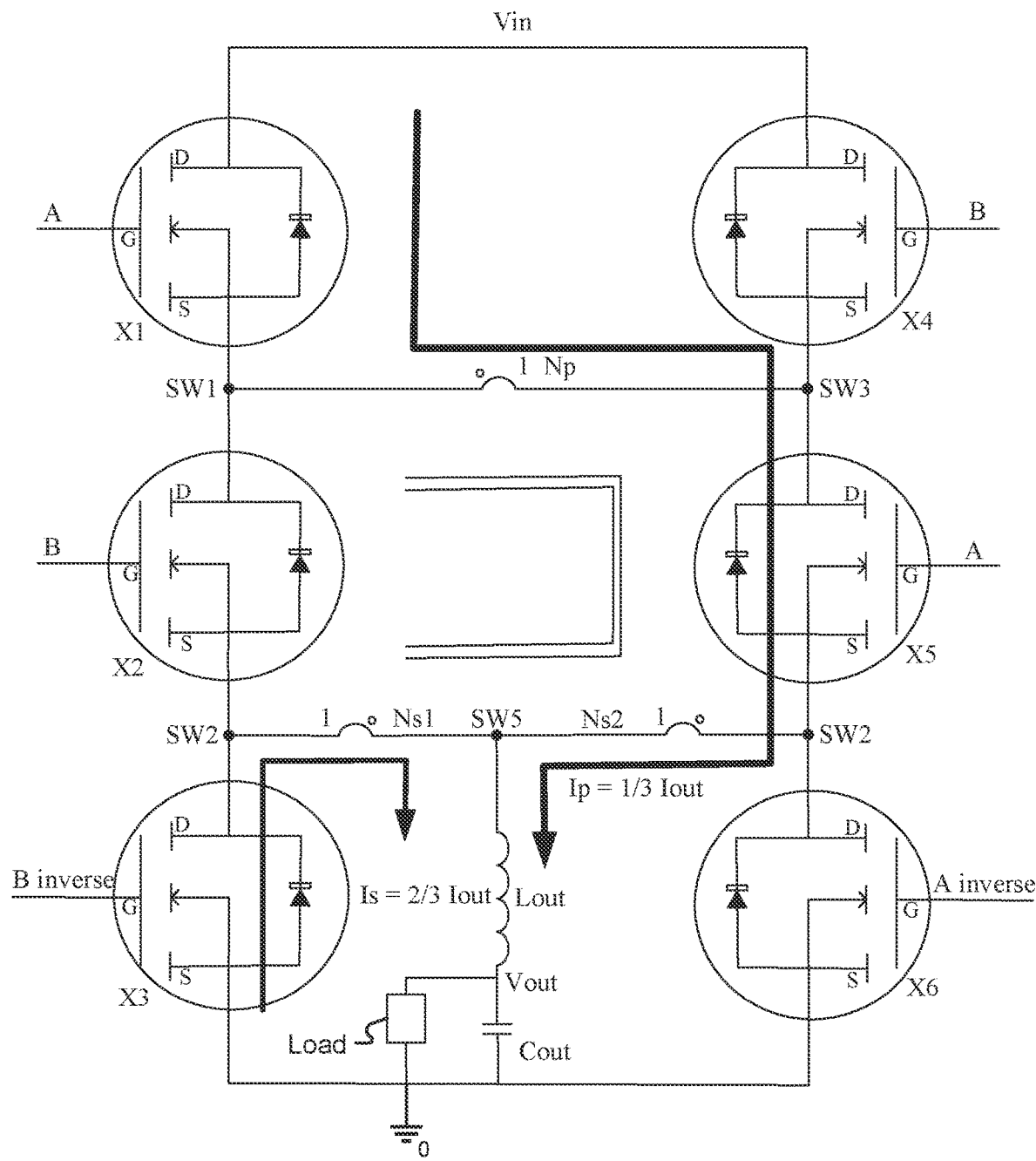
FIG. 2B is the circuit diagram representing the schematic configuration of the non-isolated DC-to-DC power converter with interconnected transformer windings of FIG. 2A illustrated in an alternative circuit design according to one embodiment of the present disclosure.
Figure 2C:
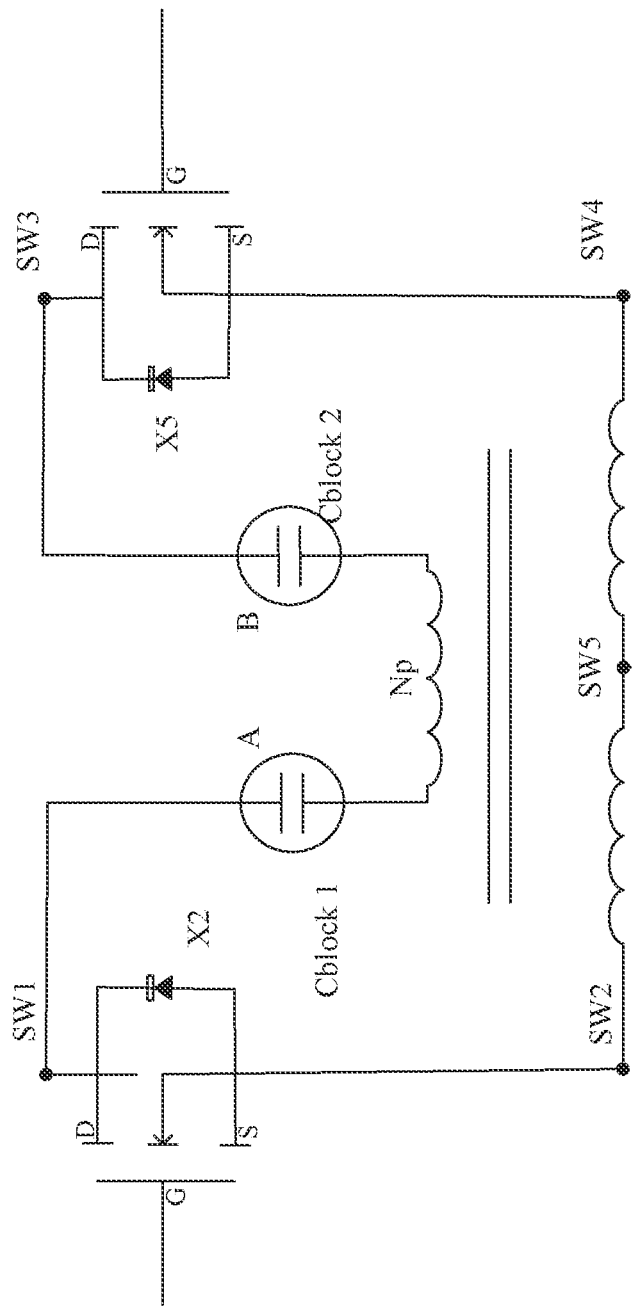
FIG. 2C is an alternative circuit diagram representing a schematic configuration of the non-isolated DC-to-DC power converter with interconnected transformer windings according to one embodiment of the present disclosure.

FIG. 2B is the circuit diagram representing the schematic configuration of the non-isolated DC to DC power converter with interconnected transformer windings of FIG. 2A illustrated in an alternative circuit design according to one embodiment of the present disclosure. As illustrated in FIG. 2B, the topology uses a 1:1+1 transformer, which is suitable for a 40-60 volts Vin, 12 volts Vout power converter. The power circuit switching elements X1, X2, X4, X5 act as power circuit switching elements and the power circuit switching elements X3 and X6 are synchronous rectification switches. When the power circuit switching elements X1, X5, X3 conduct, one third of the output voltage Vout will be seen over each of the primary winding Np and the secondary windings Ns1, Ns2. Likewise, when power circuit switching elements X4, X2, X6 conduct, one third of the output voltage Vout will be seen over each of the primary winding Np and the secondary windings Ns1, Ns2. As understood, power circuit switch elements X1, X5 (controlled by control signal A) or power circuit switching elements X4, X2 (controlled by control signal B) conduct 180-degree phase shift for the duration Ton of the period T, with Ton limited to 50% of the period T. The power circuit switching elements X3, X6 conduct for the duration Tsynch, corresponding to the period T minus Ton and minus a deadtime required to avoid cross-conduction between the turn ON and turn OFF of X2 and the turn ON and turn OFF of X3 and the corresponding turn ON and turn OFF of X5 and the turn ON and turn OFF of X6.

Regarding power circuit switching elements X1, X5, X3 conducting, since the current through the primary winding Np and the secondary winding Ns2 will go directly to the output Vout when the power circuit switching elements X1 and X5 conduct, a current that has twice the amplitude will be generated through the secondary winding Ns1 to create a current balance in the transformer TX. This indicates that the current through the secondary windings Ns1, Ns2 will be DC to a very large part. Max ⅔ of Iout, min ⅓ of Iout and ½ of Iout during the discharging phase. Another benefit is that all of the power circuit switching elements X1, X5, X3 or X4, X2, X6 are clamped to the input voltage Vin via the intrinsic diode of each of the power circuit switching elements X1, X5, X3 or X4, X2, X6. No snubbering or clamping of the voltage over the synchronous rectification power circuit switching elements is required unless for noise reduction if needed.

Figure 2D:
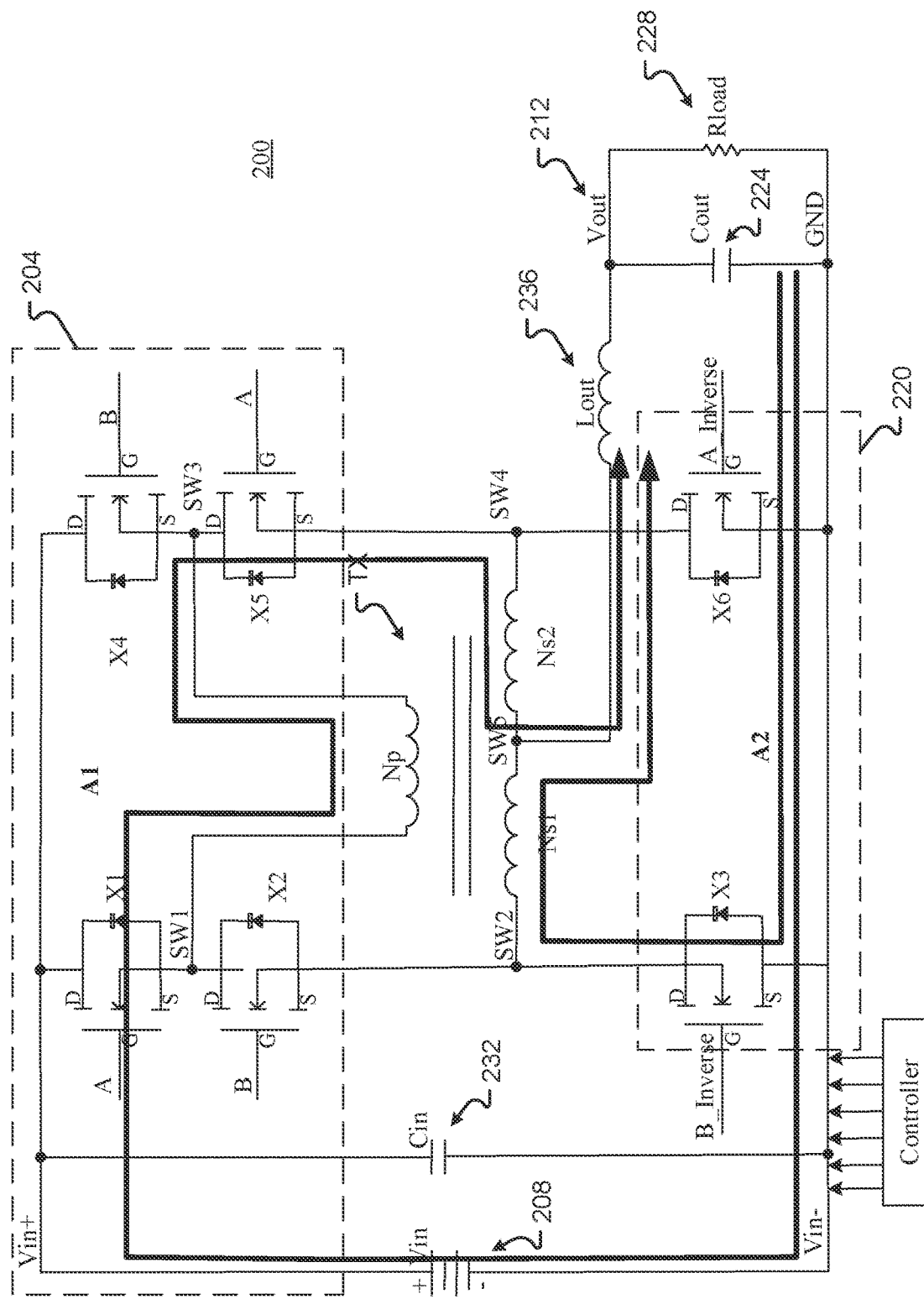
FIG. 2D is an example diagram illustrating a first mode of controlling power circuit switching elements in the non-isolated DC-to-DC power converter with interconnected transformer windings according to one embodiment of the present disclosure.

FIG. 2D is an example diagram illustrating a first mode of controlling power circuit switching elements in the non-isolated DC-to-DC power converter with interconnected transformer windings according to one embodiment of the present disclosure. In the first mode, power circuit switching elements X4, X2 and X6 are turned OFF and power circuit switching elements X1, X5 and X3 are turned ON. Circuit path A1 includes current Ip from the primary winding Np and circuit path A2 includes current Is1 from the first secondary winding Ns1. Ip is equal to one third (⅓) of the output current and Is1 is equal to two thirds (⅔) of the output current as illustrated in FIG. 2B.

Figure 2E:
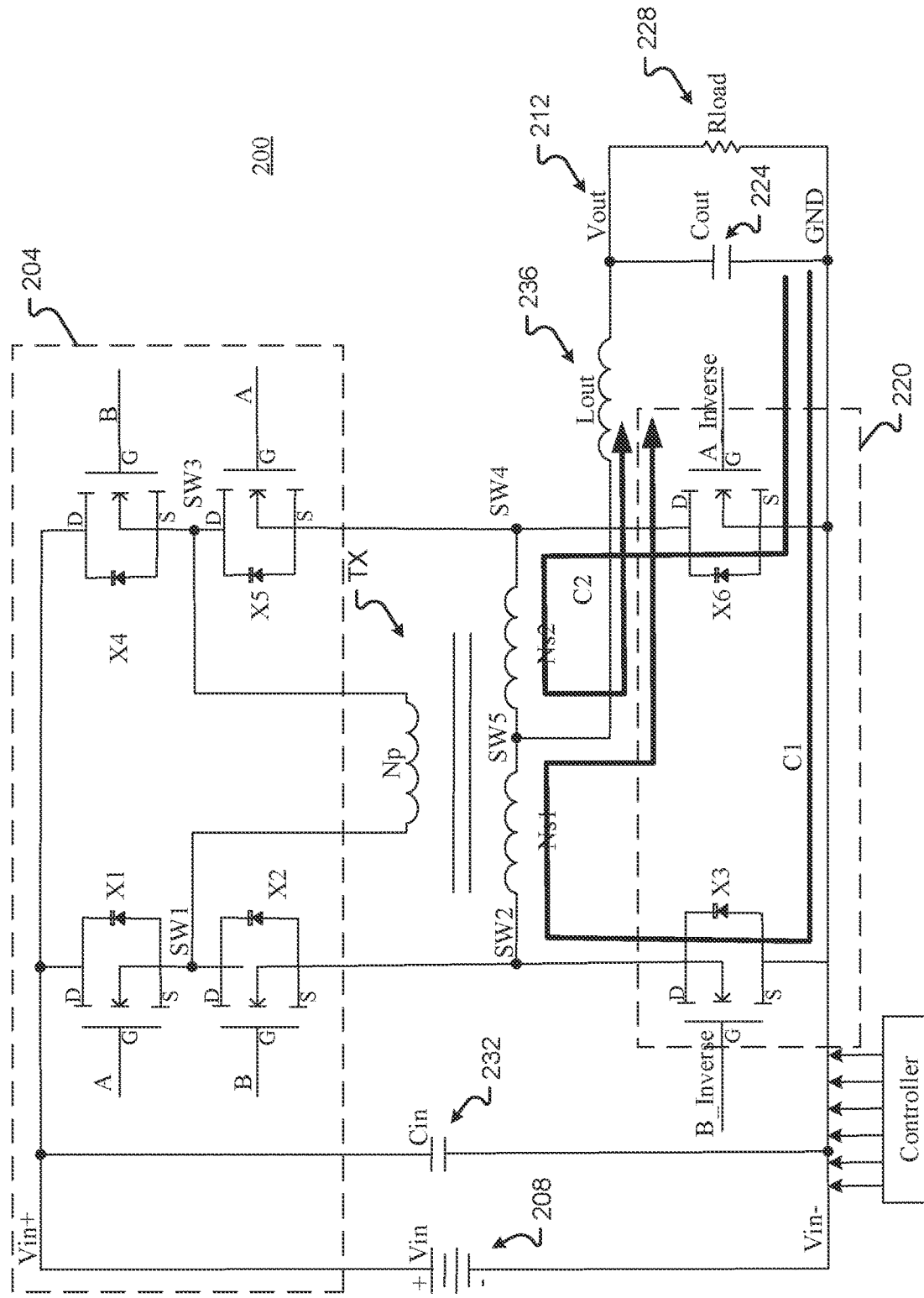
FIG. 2E is an example diagram illustrating a discharging mode of controlling power circuit switching elements in the non-isolated DC-to-DC power converter with interconnected transformer windings according to one embodiment of the present disclosure.

FIG. 2E is an example diagram illustrating a discharging mode of controlling power circuit switching elements in the non-isolated DC-to-DC power converter with interconnected transformer windings according to one embodiment of the present disclosure. In the discharging mode, power circuit switching elements X1, X2, X4 and X5 are turned OFF and power circuit switching elements X3 and X6 are also turned ON. Circuit path C1 includes current Is1 from first secondary winding Ns1 and circuit path C2 includes current Is2 from second secondary winding Ns2. Is1 and Is2 are both equal to one half (½) of the output current.

Figure 2F:
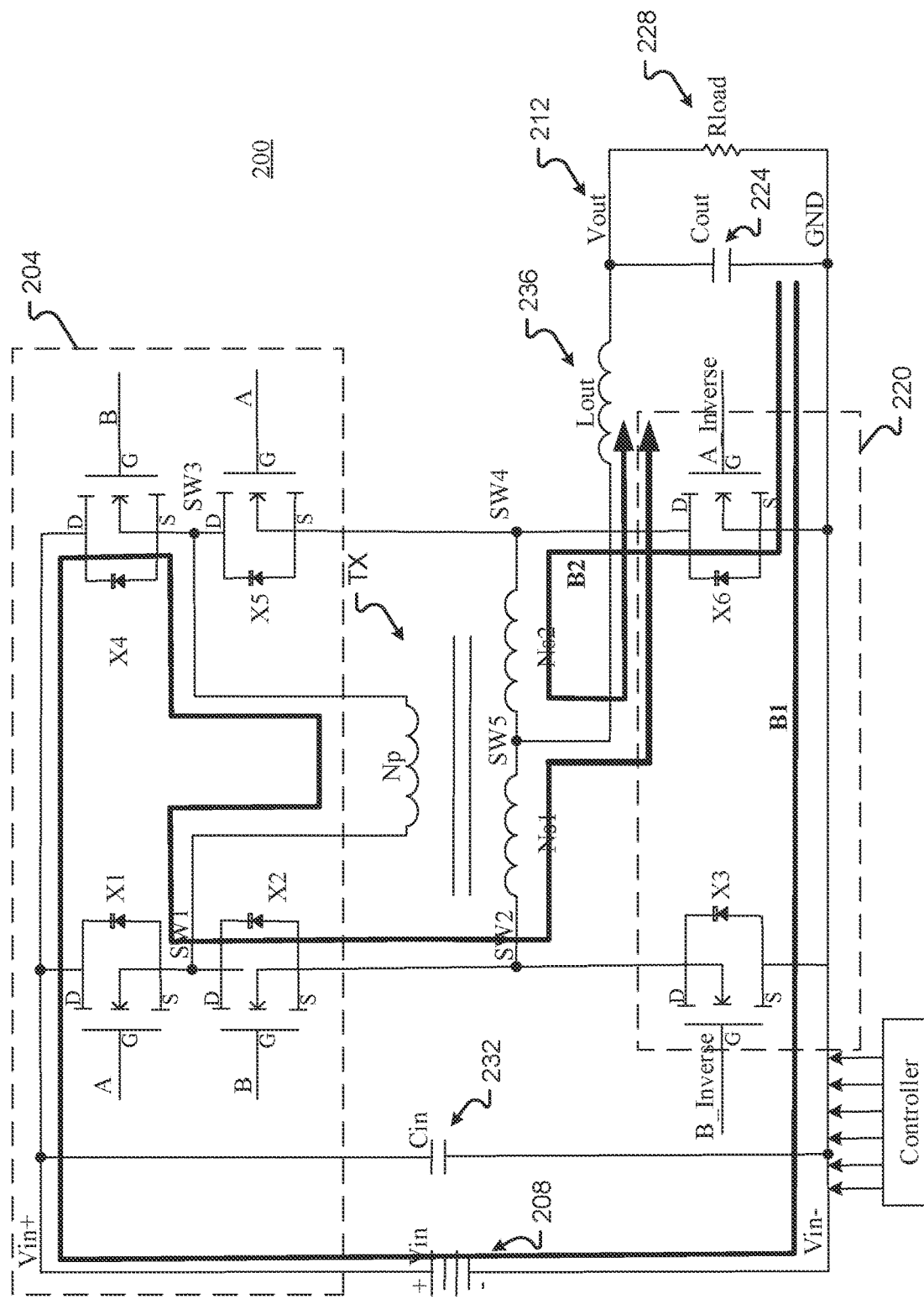
FIG. 2F is an example diagram illustrating a second mode of controlling power circuit switching elements in the non-isolated DC-to-DC power converter with interconnected transformer windings according to one embodiment of the present disclosure.

FIG. 2F is an example diagram illustrating a second mode of controlling power circuit switching elements in the non-isolated DC-to-DC power converter with interconnected transformer windings according to one embodiment of the present disclosure. In the second mode, power circuit switching elements X4, X2 and X6 are turned ON and power circuit switching elements X1, X5 and X3 are turned OFF. Circuit path B1 includes current Ip from the primary winding Np and circuit path B2 includes current Is2 from the second secondary winding Ns2. Ip is equal to one third (⅓) of the output current and Is2 is equal to two thirds (⅔) of the output current.

Figure 3:
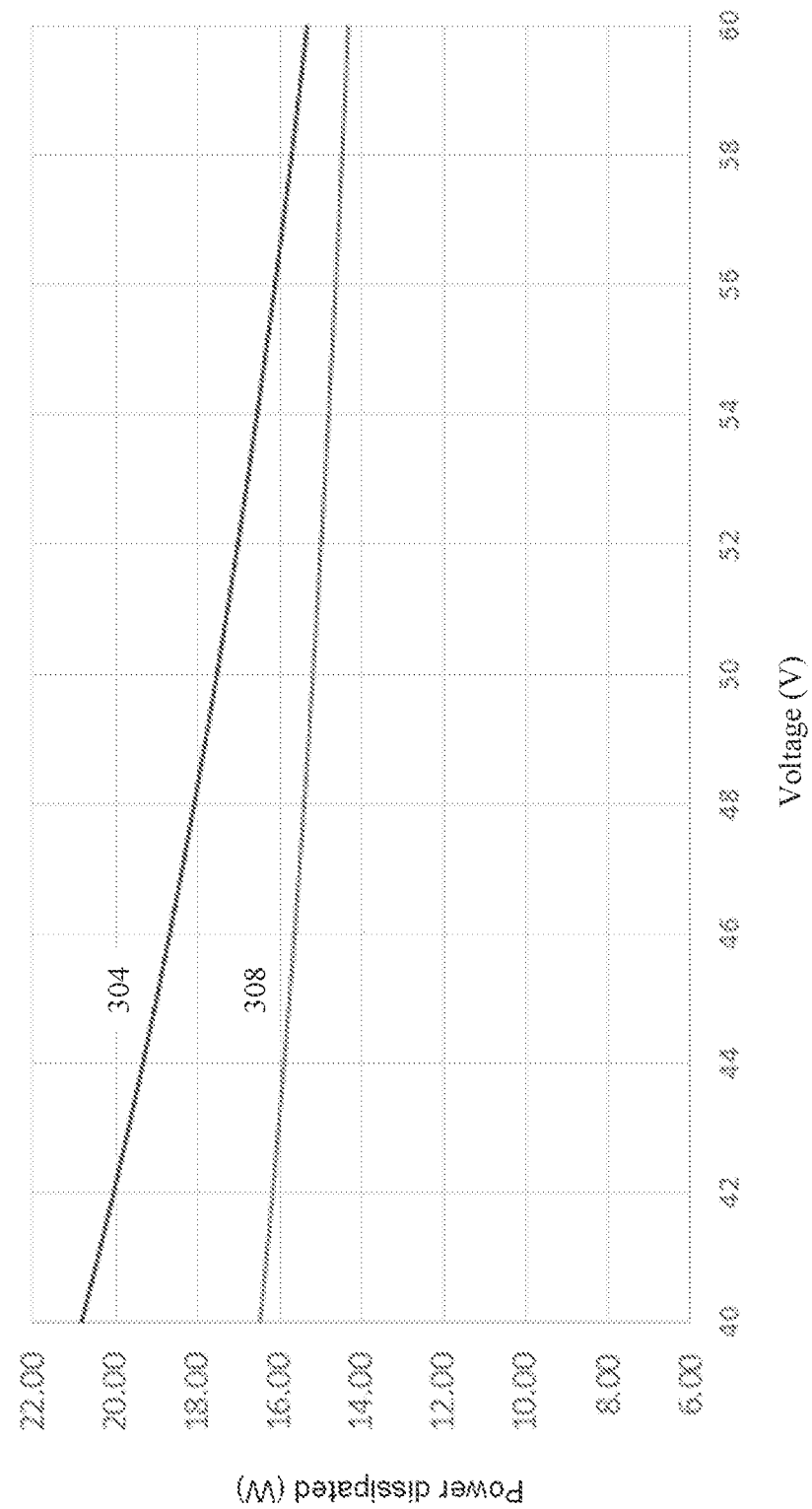
FIG. 3 is a graph illustrating a comparison of the total resistive losses between the conventional isolated DC-to-DC power converter and the non-isolated DC-to-DC power converter with interconnected transformer windings according to one embodiment of the present disclosure.

FIG. 3 is a graph 300 illustrating a comparison of the total resistive losses between the conventional isolated DC-to-DC power converter and the non-isolated DC-to-DC power converter with interconnected transformer windings according to one embodiment of the present disclosure. The horizontal axis of the graph 300 denotes the input voltage in volts (V) and the vertical axis of the graph 300 denotes the power dissipation in watts (W). The waveform 304 represents the power dissipation for the conventional isolated DC-to-DC power converter and the waveform 308 represents the power dissipation for the non-isolated DC-to-DC power converter with interconnected transformer windings.

The waveform 304 has a larger slope than the waveform 308 for smaller input voltages which equates to a greater power dissipation for the conventional isolated DC-to-DC power converter as compared to the non-isolated DC-to-DC power converter with interconnected transformer windings. Waveforms 304 and 308 have substantially the same slope for larger input voltages. According to graph 300, the conventional isolated DC-to-DC power converter dissipates approximately 21 watts of power at an input voltage of 40 volts and dissipates 20 watts of power at an input voltage of 42 volts. These values yield a slope of approximately one half (½) for the waveform 304 from 40 volts to 42 volts. Conversely, the non-isolated DC-to-DC power converter with interconnected transformer windings dissipates approximately 16.5 watts of power at an input voltage of 40 volts and dissipates 16 watts of power at an input voltage of 42 volts. These values yield a slope of approximately one fourth (¼) for the waveform 308 from 40 volts to 42 volts.

According further to graph 300, the conventional isolated DC-to-DC power converter dissipates approximately 16 watts of power at an input voltage of 58 volts and dissipates 15 watts of power at an input voltage of 60 volts. These values yield a slope of approximately three eighths (⅜) for the waveform 304 from 58 volts to 50 volts. Conversely, the non-isolated DC-to-DC power converter with interconnected transformer windings dissipates approximately 14.5 watts of power at an input voltage of 58 volts and dissipates 14.25 watts of power at an input voltage of 60 volts. These values yield a slope of approximately one eight (⅛) for the waveform 308 from 58 volts to 60 volts.

Figure 4:
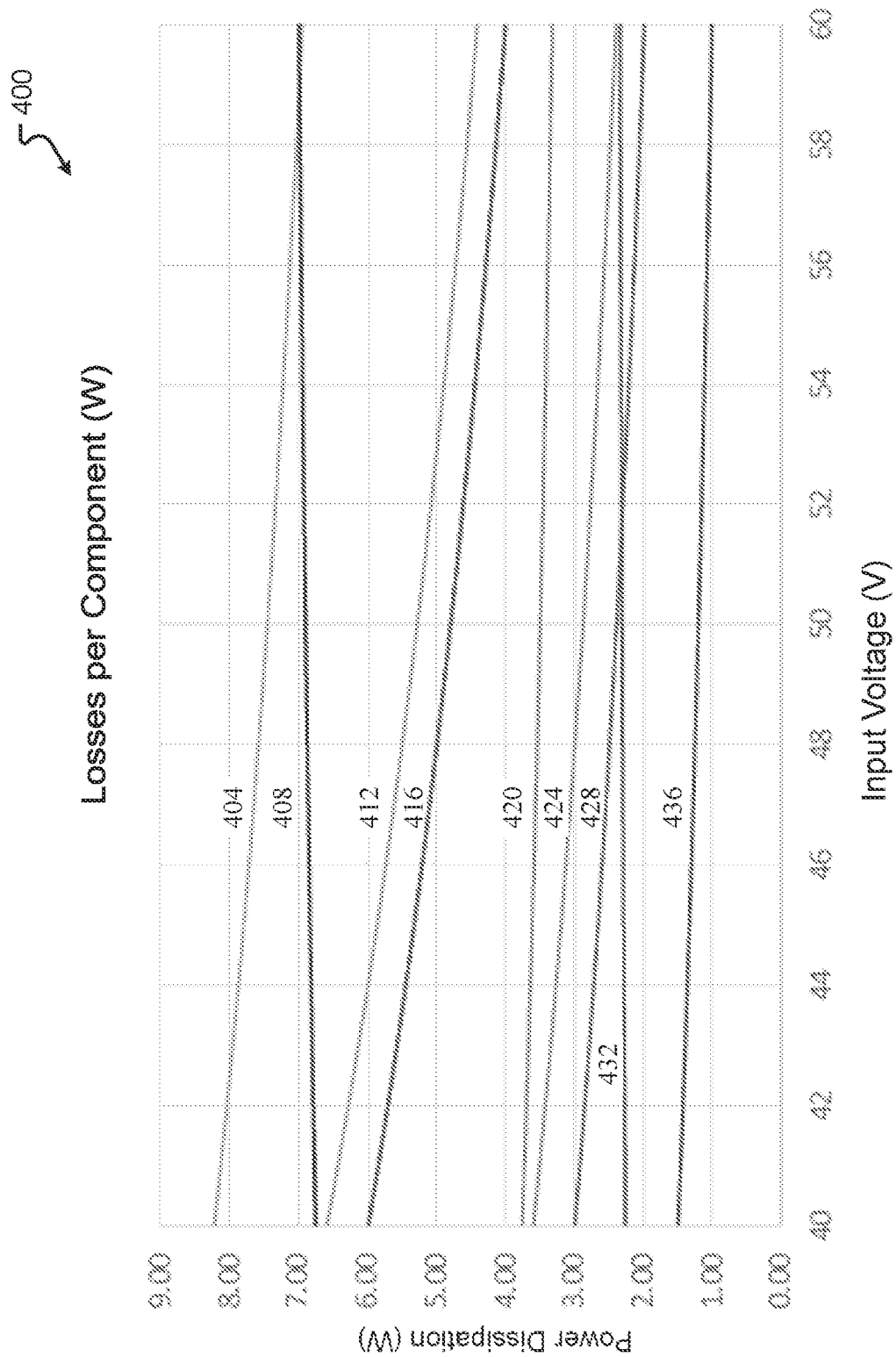
FIG. 4 is a graph illustrating a comparison of losses per component between the conventional isolated DC-to-DC power converter and the non-isolated DC-to-DC power converter with interconnected windings according to one embodiment of the present disclosure.

FIG. 4 is a graph 400 illustrating a comparison of losses per component between the conventional isolated DC-to-DC power converter and the non-isolated DC-to-DC power converter according to one embodiment of the present disclosure. The horizontal axis of the graph 400 denotes the input voltage in volts (V) and the vertical axis of the graph 400 denotes the power dissipation in watts (W). The waveform 404 represents power dissipation for the secondary power circuit switching elements of the conventional isolated DC-to-DC power converter and the waveform 408 represents the power dissipation for the secondary power switching elements of the non-isolated DC-to-DC power converter with interconnected transformer windings according to one embodiment of the present disclosure. The waveform 412 represents the power dissipation for the transformer of the conventional isolated DC-to-DC power converter. The waveform 416 represents the power dissipation for the primary power switching elements for both the conventional isolated DC-to-DC power converter and the non-isolated DC-to-DC power converter with interconnected transformer windings according to one embodiment of the present disclosure.

The waveform 420 represents the power dissipation for the transformer of the non-isolated DC-to-DC power converter with interconnected windings according to one embodiment of the present disclosure and the waveform 424 represents the power dissipation for the secondary windings of the conventional isolated DC-to-DC power converter. The waveform 428 represents the power dissipation for the primary winding of the conventional isolated DC-to-DC power converter and the waveform 432 represents the power dissipation for the secondary windings of the non-isolated DC-to-DC power converter with interconnected transformer windings according to one embodiment of the present disclosure. The waveform 436 represents the power dissipation for the primary winding of the non-isolated DC-to-DC power converter with interconnected transformer windings according to one embodiment of the present disclosure. In general, the waveforms have a larger slope for smaller input voltages which equates to a greater power dissipation at the smaller input voltages and less power dissipation at larger input voltages.

Figure 5:
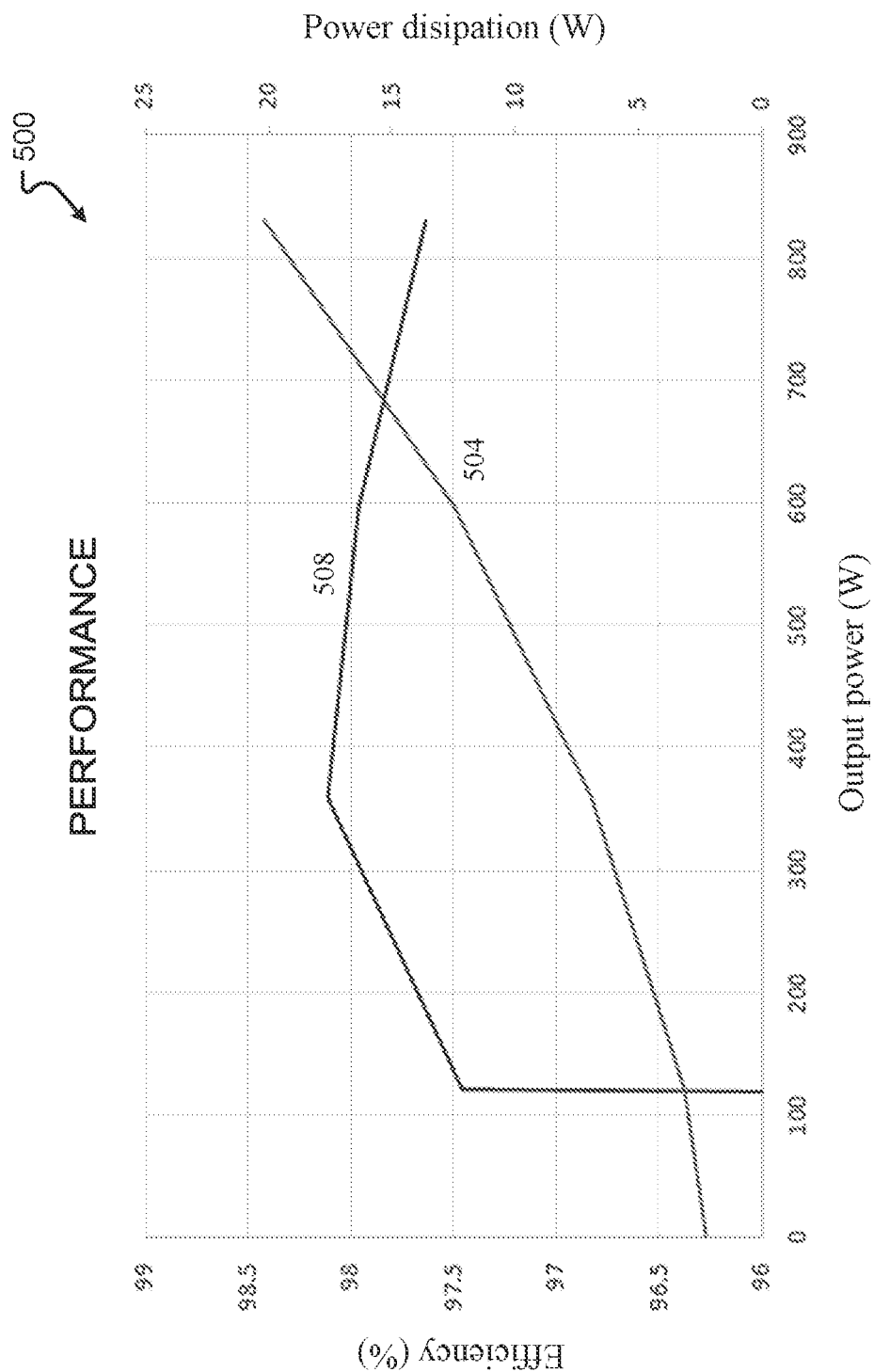
FIG. 5 is a graph illustrating the performance of the non-isolated DC-to-DC power converter with interconnected transformer windings according to one embodiment of the present disclosure.
Figure 9A:
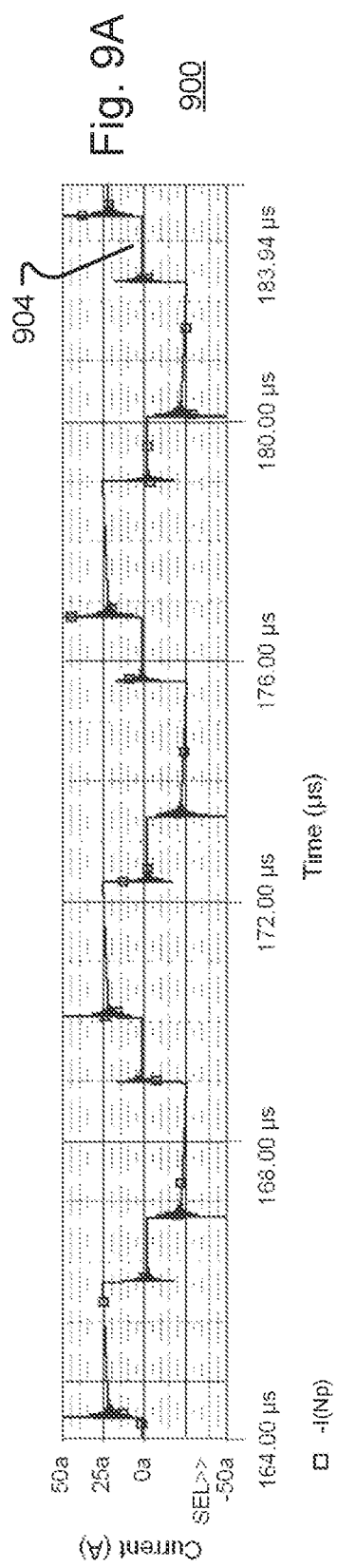
FIGS. 9A-9D are graphs illustrating the transformer winding currents and the output current for the non-isolated DC-to-DC power converter with interconnected transformer windings according to one embodiment of the present disclosure.
Figure 9B:
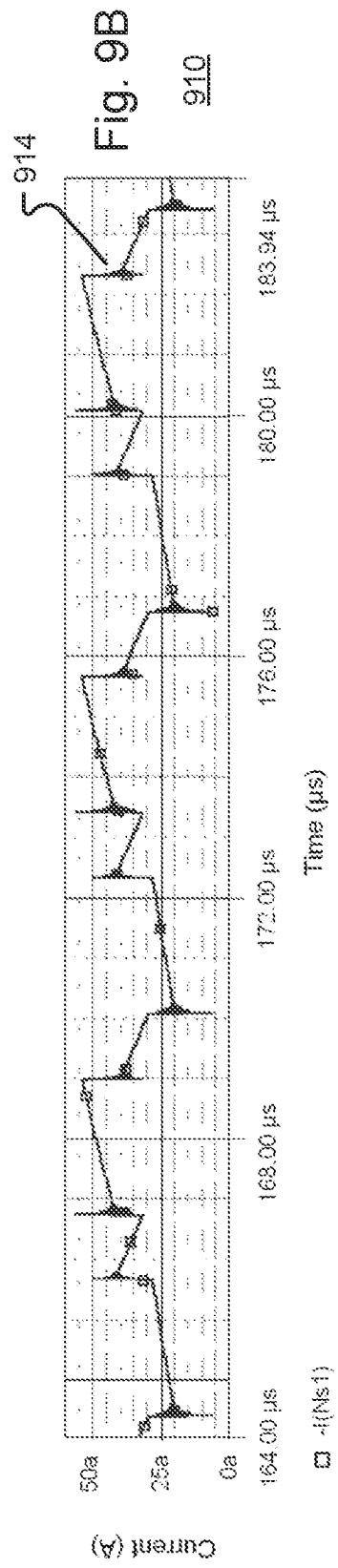
Figure 9C:
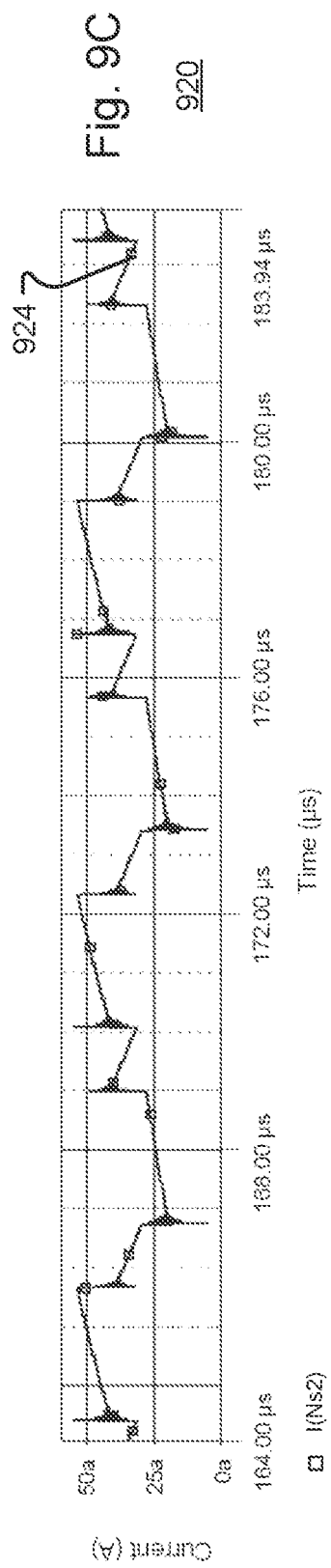
Figure 9D:
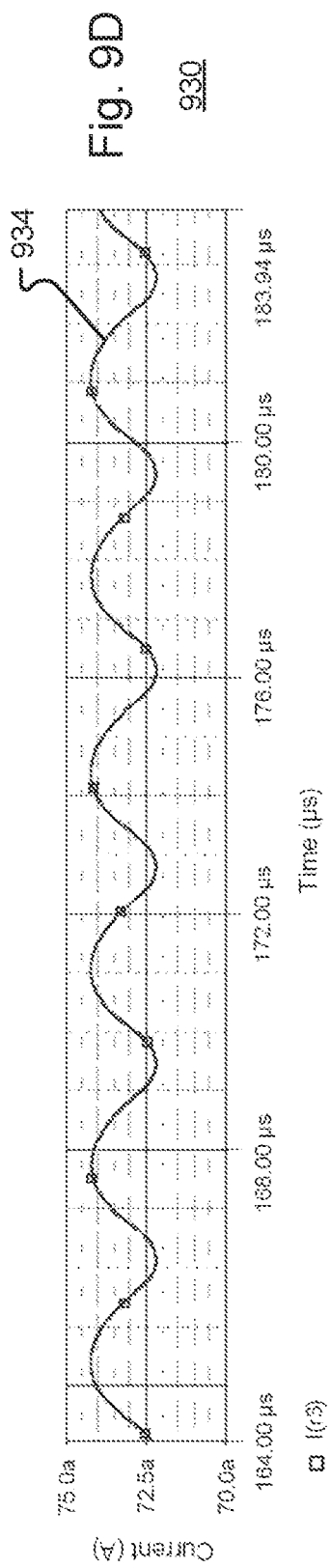
Figure 10C:
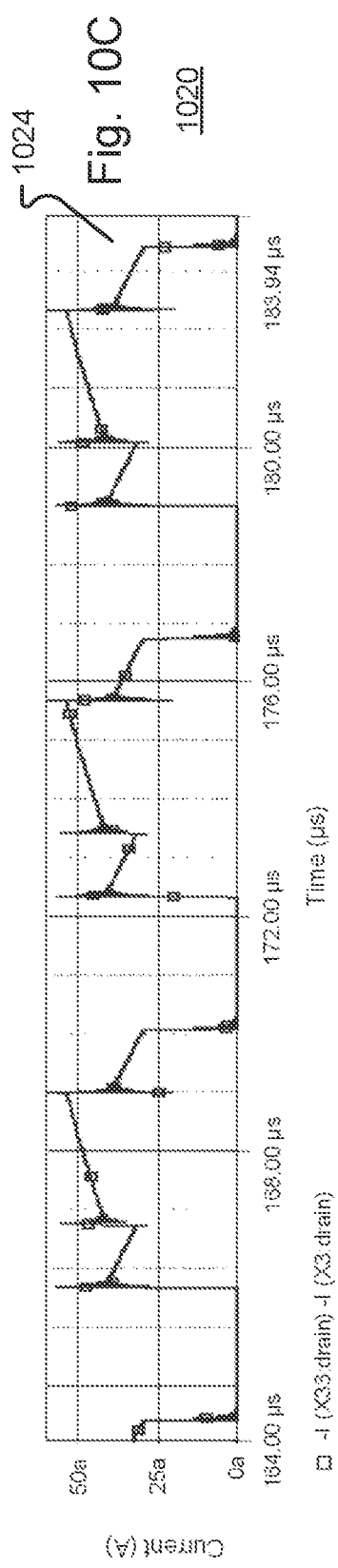
Figure 10D:
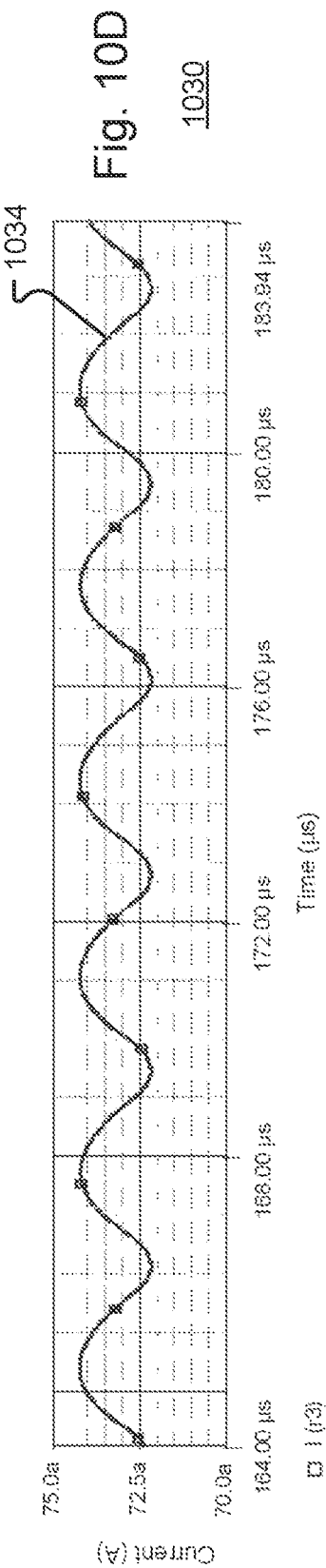

FIG. 5 is a graph 500 illustrating the performance of the non-isolated DC-to-DC power converter with interconnected transformer windings according to one embodiment of the present disclosure. The horizontal axis of the graph 500 denotes output power in watts (W); the left-hand side vertical axis of the graph 500 denotes efficiency in percentage (%) and the right-hand side vertical axis of the graph 500 denotes power dissipation in watts (W). The waveform 504 represents the power dissipation for the non-isolated DC-to-DC power converter with interconnected transformer windings which is the input power minus the output power and the waveform 508 represents a ratio of the output power over the input power in percentage for the non-isolated DC-to-DC power converter with interconnected transformer windings.

As illustrated in graph 500, the non-isolated DC-to-DC power converter with interconnected transformer windings dissipates approximately 2.5 watts (W) of power at an output power of 0 watts (W) and dissipates approximately 20 watts (W) of power at an output power of 840 watts (W) as illustrated by waveform 504. The non-isolated DC-to-DC power converter with interconnected transformer windings has an efficiency of 96% at an output power of 120 watts (W) and has an efficiency of approximately 97.7% at an output power of 840 watts (W) as illustrated by waveform 508.

FIGS. 6A-6D are graphs 600-630 illustrating the control signals for the power circuit switching elements for the non-isolated DC-to-DC power converter with interconnected transformer windings according to one embodiment of the present disclosure. For each of the graphs 600-630, the horizontal axis of the graphs 600-630 denotes the time in microseconds (µs) and the vertical axis of the graphs 600-630 denotes the voltage in volts (V). The waveform 604 illustrated in graph 600 represents the control signal A for the primary power circuit switching elements X1, X5 and the waveform 614 illustrated in graph 610 represents the control signal B for the primary power circuit switching elements X2, X4. The waveform 624 illustrated in graph 620 represents the control signal A_Inverse for the secondary power circuit switching element $X_3$ and the waveform 634 illustrated in graph 630 represents the control signal B_Inverse for the secondary power circuit switching element X6. As illustrated, the period is T and Ton is the duration. The power circuit switching elements X3, X6 conduct for the duration Tsynch, corresponding to the period T minus Ton and minus a deadtime required to avoid cross-conduction between the turn ON and turn OFF of X2 and the turn ON and turn OFF of X3 and the corresponding turn ON and turn OFF of X5 and the turn ON and turn OFF of X6.

FIGS. 7A-7C are graphs 700-720 illustrating switch node voltages for the power circuit switching elements for the non-isolated DC-to-DC power converter with interconnected transformer windings according to one embodiment of the present disclosure. For each of the graphs 700-720, the horizontal axis of the graphs 700-720 denotes the time in microseconds (μs) and the vertical axis of the graphs 700-720 denotes the voltage in volts (V). The waveform 704 illustrated in graph 700 represents the switch node SW1 is a floating node because it does not go to ground and the waveform 714 illustrated in graph 710 represents the switch node SW2. The waveform 724 illustrated in graph 720 represents the switch node SW5 provided between switch node SW2 and switch node SW4. At time t1, the voltage at SW5 is less than half the voltage of SW1.

FIGS. 8A-8C are graphs 800-820 illustrating power circuit switching element voltages for the non-isolated DC-to-DC power converter with interconnected transformer windings according to one embodiment of the present disclosure. For each of the graphs 800-820, the horizontal axis of the graphs 800-820 denotes the time in microseconds (μs) and the vertical axis of the graphs 800-820 denotes the voltage in volts (V). The waveform 804 illustrated in graph 800 represents voltage for the primary power circuit switching element X1 and the waveform 814 illustrated in graph 810 represents the voltage for the primary power circuit switching element X2. The waveform 824 illustrated in graph 820 represents the voltage for the secondary power circuit switching element X3.

FIGS. 9A-9D are graphs 900-930 illustrating the transformer winding currents and the output current for the non-isolated DC-to-DC power converter with interconnected transformer windings according to one embodiment of the present disclosure. For each of the graphs 900-930, the horizontal axis of the graphs 900-930 denotes the time in microseconds (μs) and the vertical axis of the graphs 900-930 denotes the current in amps (A). The waveform 904 illustrated in graph 900 represents current for the primary winding Np and the waveform 914 illustrated in graph 910 represents the current for the secondary winding Ns1. The waveform 924 illustrated in graph 920 represents the current for the secondary winding Ns2. The waveform 934 illustrated in graph 930 represents the output current as seen by the load.

FIGS. 10A-10D are graphs illustrating the power circuit switching element currents and the output current for the non-isolated DC-to-DC power converter with interconnected transformer windings according to one embodiment of the present disclosure. For each of the graphs 1000-1030, the horizontal axis of the graphs 1000-1030 denotes the time in microseconds (μs) and the vertical axis of the graphs 1100-1120 denotes the current in amps (A). The waveform 1004 illustrated in graph 1000 represents the current for the primary power circuit switching element X1 and the waveform 1014 illustrated in graph 1010 represents the current for the primary power circuit switching element X2. The waveform 1024 illustrated in graph 1020 represents the current for the secondary power circuit switching element X3. The waveform 1034 illustrated in graph 1030 represents the output current as seen by the load.

Figure 11:
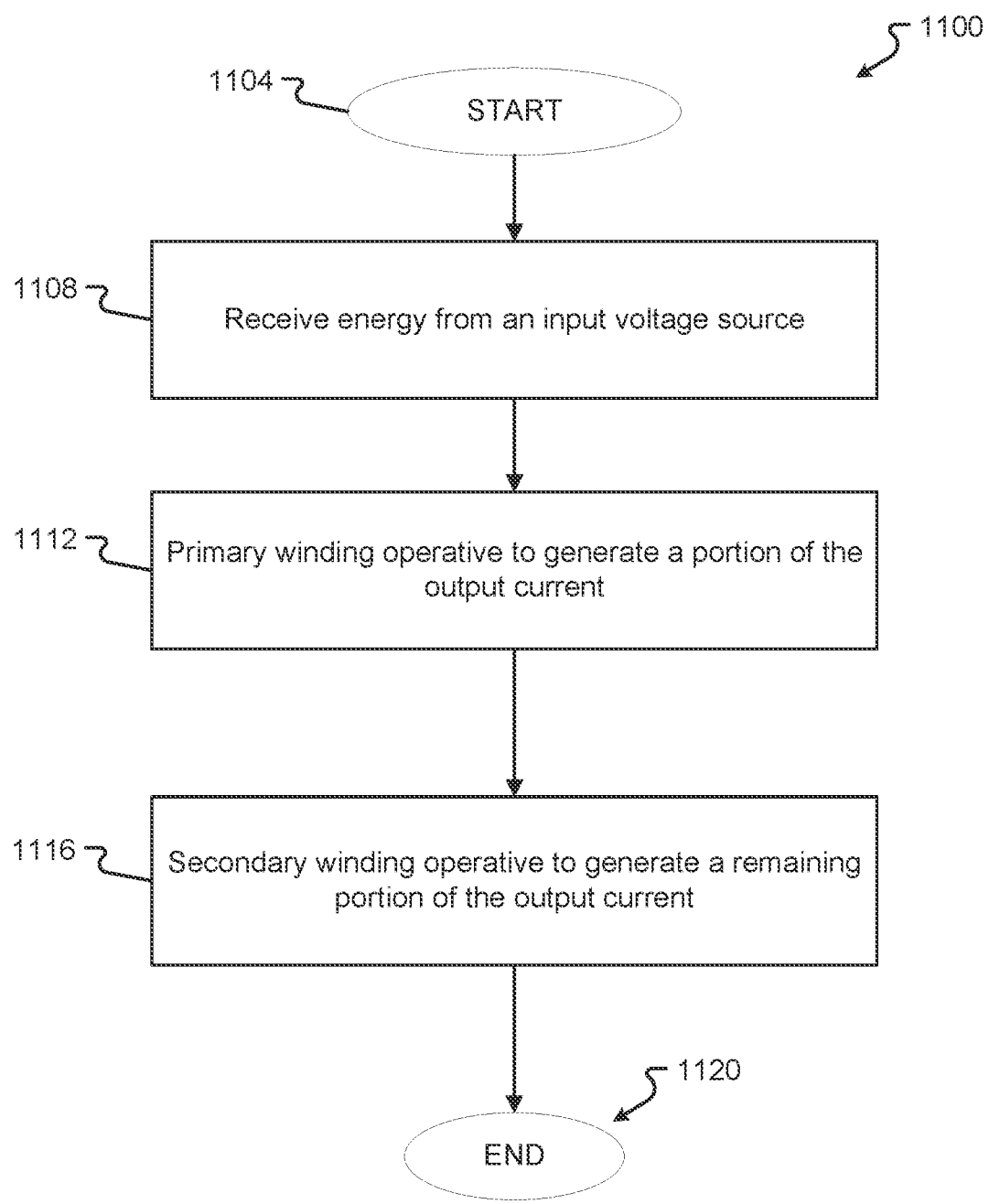
FIG. 11 illustrates a flowchart of a method of converting voltages using the non-isolated DC-to-DC power converter with interconnected transformer windings according to one embodiment of the present disclosure.

FIG. 11 illustrates a flowchart of a method of converting voltages using the non-isolated DC-to-DC power converter with interconnected transformer windings according to one embodiment of the present disclosure.

While a general order for the steps of the method 1100 for converting voltages using the non-isolated DC-to-DC power converter with interconnected transformer windings is shown in FIG. 11, the method 1100 can include more or fewer steps or can arrange the order of the steps differently than those shown in FIG. 11. Further, two or more steps may be combined into one step. Generally, the method 1100 starts with a START operation 1104 and ends with an END operation 1120. The method can be executed on a set of computer-executable instructions executed by a data processing system and encoded or stored on a computer readable medium. Herein, the method 1100 shall be explained with reference to systems and components, modules, software, data structures, user interfaces, etc. described above.

Method 1100 may start at START operation 1104 and proceed to step 1108 where the energy is received from an input voltage source. After energy is received from the input voltage source at step 1108, method 1100 proceeds to step 1112, where the primary winding of the transformer is operative to generate a portion of the output current based on energy received from the primary winding of the transformer and energy received from the first secondary winding of the transformer. After the primary winding of the transformer is operative to generate a portion of the output current at step 1112, method 1100 proceeds to step 1116 where the second secondary winding of the transformer is operative to generate a remaining portion of the output current based on energy received from the second secondary winding of the transformer. After the second winding of the transformer is operative to generate a remaining portion of the output current, method 1100 proceeds to END operation 1120 where method 1100 may end.

Any of the steps, functions, and operations discussed herein can be performed continuously and automatically.

The exemplary devices, systems and methods of this disclosure have been described in relation to a power converter. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an apparatus. The apparatus includes a first circuit path including a series combination of a primary winding of a transformer and a first secondary winding of the transformer and a second circuit path including a second secondary winding of the transformer. The primary winding of the transformer is magnetically coupled to the first and second secondary windings of the transformer and the primary winding of the transformer is detachably coupled to each of the first and second secondary windings of the transformer. The primary winding of the transformer is operative to generate a portion of an output current based on energy received from the primary winding of the transformer, and the second secondary winding of the transformer is operative to generate a remaining portion of the output current based on energy received from the second secondary winding of the transformer.

Aspects of the above apparatus include multiple switching elements operable to convey the energy from a voltage source to the primary winding of the transformer.

Aspects of the above apparatus including the transformer providing serial connectivity of the first secondary winding of the transformer and the second secondary winding of the transformer.

Aspects of the above apparatus include the first and second secondary windings of the transformer are operative to generate an output voltage based on the energy conveyed to the primary winding of the transformer.

Aspects of the above apparatus include the output voltage is a direct current (DC) voltage.

Aspects of the above apparatus include the primary winding is a flying primary winding.

Aspects of the above apparatus include an inductor connected between the first and second secondary windings of the transformer.

Aspects of the above apparatus include the output current Iout is based on a current of either the first or the second secondary winding of the transformer and a current of the primary winding of the transformer defined as Is=Iout*(1−Ns/(Np+2*Ns)) and Ip=Iout*Ns/(Np+2*Ns), where Ns is the first secondary winding of the transformer or the second secondary winding of the transformer, Np is the primary winding of the transformer, Is is the current of Ns and Ip is the current of Np .

Aspects of the above apparatus include the output voltage Vout is defined as Vout=Vin*D*Ns/(Np+2*Ns) where Vin is an input voltage, D is a duty cycle, Ns is the first secondary winding of the transformer or the second secondary winding of the transformer and Np is the primary winding of the transformer.

Aspects of the above apparatus include multiple switches connected to the first and second secondary windings of the transformer.

Aspects of the above apparatus include each of the primary winding, the first secondary winding and the second secondary winding has a same number of turns.

Embodiments include a system. The system includes a power converter including a first circuit path including a series combination of a primary winding of a transformer and a first secondary winding of the transformer, a second circuit path including a second secondary winding of the transformer and first switching elements and first switching elements and second switching elements connected on opposing sides of the transformer and connected via a common ground. The primary winding of the transformer is magnetically coupled to the first and second secondary windings of the transformer and the primary winding of the transformer is detachably coupled to each of the first and second secondary windings of the transformer The primary winding of the transformer is operative to generate a portion of an output current based on energy received from the primary winding of the transformer and the second secondary winding of the transformer is operative to generate a remaining portion of the output current based on energy received from the second secondary winding of the transformer. The system further includes control circuitry configured to control switching of the first switching elements and the second switching elements to regulate an output voltage of the power converter.

Aspects of the above system include the transformer providing serial connectivity of the first secondary winding of the transformer and the second secondary winding of the transformer.

Aspects of the above system include the first and second secondary windings of the transformer are operative to generate the output voltage based on the energy conveyed to the primary winding of the transformer.

Aspects of the above system include the output voltage is a direct current (DC) voltage.

Aspects of the above system include the primary winding is a flying primary winding.

Aspects of the above system include an inductor connected between the first and second secondary windings of the transformer.

Aspects of the above system include the output current Iout is based on a current of either the first or the second secondary winding of the transformer and a current of the primary winding of the transformer defined as Is=Iout*(1−Ns/(Np+2*Ns)) and Ip=Iout*Ns/(Np+2*Ns), where Ns is the first secondary winding of the transformer or the second secondary winding of the transformer, Np is the primary winding of the transformer, Is is the current of Ns and Ip is the current of Np.

Aspects of the above system include the output voltage Vout is defined as Vout=Vin*D*Ns/(Np+2*Ns) where Vin is an input voltage, D is a duty cycle, Ns is the first secondary winding of the transformer or the second secondary winding of the transformer and Np is the primary winding of the transformer.

Embodiments include a method. The method includes providing a first circuit path including a series combination of a primary winding of a transformer and a first secondary winding of the transformer and providing a second circuit path including a second secondary winding of the transformer. The primary winding of the transformer is magnetically coupled to the first and second secondary windings of the transformer and the primary winding of the transformer is detachably coupled to each of the first and second secondary windings of the transformer. The primary winding of the transformer is operative to generate a portion of an output current based on energy received from the primary winding of the transformer and the second secondary winding of the transformer is operative to generate a remaining portion of the output current based on energy received from the second secondary winding of the transformer.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus, comprising:
   a first circuit path including a series combination of a primary winding of a transformer and a first secondary winding of the transformer; and
   a second circuit path including a second secondary winding of the transformer,
   wherein the primary winding of the transformer is magnetically coupled to the first and second secondary windings of the transformer,
   wherein the primary winding of the transformer is detachably coupled to each of the first and second secondary windings of the transformer,
   wherein the primary winding of the transformer is operative to generate a portion of an output current based on energy received from the primary winding of the transformer,
   wherein the second secondary winding of the transformer is operative to generate a remaining portion of the output current based on energy received from the second secondary winding of the transformer, and
   wherein each of the primary winding, the first secondary winding and the second secondary winding has a same number of turns.

2. The apparatus of claim 1, further comprising multiple switching elements operable to convey energy from a voltage source to the primary winding of the transformer.

3. The apparatus of claim 2, wherein the first and second secondary windings of the transformer are operative to generate an output voltage based on energy conveyed to the primary winding of the transformer.

4. The apparatus of claim 3, wherein the output voltage is a direct current (DC) voltage.

5. The apparatus of claim 3, wherein the output voltage Vout is defined as $V_{out} = V_{in} \ast D \ast N_s / (N_p + 2 \ast N_s)$ where Vin is an input voltage, D is a duty cycle, Ns is the first secondary winding of the transformer or the second secondary winding of the transformer and Np is the primary winding of the transformer.

6. The apparatus of claim 1, wherein the transformer provides serial connectivity of the first secondary winding of the transformer and the second secondary winding of the transformer.

7. The apparatus of claim 1, further comprising an inductor connected between the first and second secondary windings of the transformer.

8. The apparatus of claim 1, wherein the output current Tout is based on a current of either the first or the second secondary winding of the transformer and a current of the primary winding of the transformer defined as Is=Iout* (1−Ns/(Np+2*Ns)) and Ip=Iout* Ns/(Np+2*Ns), where Ns is the first secondary winding of the transformer or the second secondary winding of the transformer, Np is the primary winding of the transformer, Is is the current of Ns and Ip is the current of Np.

9. The apparatus of claim 1, further comprising multiple switches connected to the first and second secondary windings of the transformer.

10. The apparatus of claim 1, wherein the same number of turns equals one.

11. A system, comprising:
a power converter comprising:
a first circuit path including a series combination of a primary winding of a transformer and a first secondary winding of the transformer;
a second circuit path including a second secondary winding of the transformer; and
first switching elements and second switching elements connected on opposing sides of the transformer and connected via a common ground,
wherein the primary winding of the transformer is magnetically coupled to the first and second secondary windings of the transformer,
wherein the primary winding of the transformer is detachably coupled to each of the first and second secondary windings of the transformer,
wherein the primary winding of the transformer is operative to generate a portion of an output current based on energy received from the primary winding of the transformer, and
wherein the second secondary winding of the transformer is operative to generate a remaining portion of the output current based on energy received from the second secondary winding of the transformer, and
wherein each of the primary winding, the first secondary winding and the second secondary winding has a same number of turns; and
control circuity configured to control switching of the first switching elements and the second switching elements to regulate an output voltage of the power converter.

12. The system of claim 11, wherein the transformer provides serial connectivity of the first secondary winding of the transformer and the second secondary winding of the transformer.

13. The system of claim 11, wherein the first and second secondary windings of the transformer are operative to generate the output voltage based on energy conveyed to the primary winding of the transformer.

14. The system of claim 11, wherein the output voltage is a direct current (DC) voltage.

15. The system of claim 11, further comprising an inductor connected between the first and second secondary windings of the transformer.

16. The system of claim 11, wherein the output current Tout is based on a current of either the first or the second secondary winding of the transformer and a current of the primary winding of the transformer defined as Is=Iout* (1−Ns/(Np+2*Ns)) and Ip=Iout* Ns/(Np+2*Ns), where Ns is the first secondary winding of the transformer or the second secondary winding of the transformer, Np is the primary winding of the transformer, Is is the current of Ns and Ip is the current of Np.

17. The system of claim 11 wherein the output voltage Vout is defined as Vout=Vin*D*Ns/(Np+2*Ns) where Vin is an input voltage, D is a duty cycle, Ns is the first secondary winding of the transformer or the second secondary winding of the transformer and Np is the primary winding of the transformer.

18. The system of claim 11, wherein the same number of turns equals one.

19. A method, comprising:
providing a first circuit path including a series combination of a primary winding of a transformer and a first secondary winding of the transformer; and
providing a second circuit path including a second secondary winding of the transformer,
wherein the primary winding of the transformer is magnetically coupled to the first and second secondary windings of the transformer,
wherein the primary winding of the transformer is detachably coupled to each of the first and second secondary windings of the transformer,
wherein the primary winding of the transformer is operative to generate a portion of an output current based on energy received from the primary winding of the transformer, and
wherein the second secondary winding of the transformer is operative to generate a remaining portion of the output current based on energy received from the second secondary winding of the transformer, and
wherein each of the primary winding, the first secondary winding and the second secondary winding has a same number of turns.

20. The method of claim 19, wherein the same number of turns equals one.

* * * * *